US011860639B2

(12) United States Patent
Chen

(10) Patent No.: US 11,860,639 B2
(45) Date of Patent: Jan. 2, 2024

(54) VEHICLE-BASED ROAD OBSTACLE IDENTIFICATION SYSTEM

(71) Applicant: Beijing Voyager Technology Co., Ltd., Beijing (CN)

(72) Inventor: Qi Chen, Burlingame, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 0 days.

(21) Appl. No.: 17/902,752

(22) Filed: Sep. 2, 2022

(65) Prior Publication Data

US 2023/0146119 A1 May 11, 2023

Related U.S. Application Data

(63) Continuation of application No. 16/236,084, filed on Dec. 28, 2018, now Pat. No. 11,435,751.

(51) Int. Cl.
*G05D 1/02* (2020.01)
*G08G 1/01* (2006.01)
*G05D 1/00* (2006.01)

(52) U.S. Cl.
CPC ........... *G05D 1/024* (2013.01); *G05D 1/0088* (2013.01); *G05D 1/0221* (2013.01);
(Continued)

(58) Field of Classification Search
CPC .... G05D 1/024; G05D 1/0088; G05D 1/0221; G05D 1/0274; G05D 2201/0213; G08G 1/0112
See application file for complete search history.

(56) References Cited

U.S. PATENT DOCUMENTS

| 4,368,428 A | 1/1983 | Dijkman |
| 8,698,611 B2 | 4/2014 | Theisen |

(Continued)

FOREIGN PATENT DOCUMENTS

| CN | 106996793 | 8/2017 |
| CN | 108510797 | 9/2018 |

(Continued)

OTHER PUBLICATIONS

International Search Report and Written Opinion in International Application No. PCT/US2018/068030, Notification dated Apr. 3, 2019.

(Continued)

*Primary Examiner* — Ig T An
(74) *Attorney, Agent, or Firm* — Knobbe Martens Olson & Bear LLP

(57) ABSTRACT

A vehicle can include an on-board data processing system that receives sensor data captured by various sensors of the vehicle. As a vehicle travels along a route, the on-board data processing system can process the captured sensor data to identify a potential vehicle stop. The on-board data processing system can then identify geographical coordinates of the location at which the potential vehicle stop occurred, use artificial intelligence to classify a situation of the vehicle at the potential stop, and determine whether the stop was caused by a road obstacle, such as a speed bump, a gutter, an unmarked crosswalk, or any other obstacle not at an intersection. If the stop was caused by the road obstacle, the on-board data processing system can generate virtual stop or yield line data corresponding to the identified geographic coordinates and transmit this data to a server over a network for processing.

20 Claims, 14 Drawing Sheets

(52) U.S. Cl.
CPC ......... *G05D 1/0274* (2013.01); *G08G 1/0112* (2013.01); *G05D 2201/0213* (2013.01)

(56) References Cited

U.S. PATENT DOCUMENTS

| | | | |
|---|---|---|---|
| 9,286,520 | B1 | 3/2016 | Lo et al. |
| 9,542,626 | B2 | 1/2017 | Martinson et al. |
| 10,531,004 | B2 | 1/2020 | Wheeler et al. |
| 10,595,176 | B1 | 3/2020 | Gallagher |
| 10,627,512 | B1 | 4/2020 | Hicks |
| 10,990,105 | B2 | 4/2021 | Chen |
| 10,991,244 | B2 | 4/2021 | Chen |
| 11,373,524 | B2 | 6/2022 | Chen |
| 2008/0147305 | A1 | 6/2008 | Kawamata et al. |
| 2011/0148695 | A1 | 6/2011 | Mizuochi |
| 2012/0226392 | A1 | 9/2012 | Kataoka |
| 2014/0067153 | A1 | 3/2014 | Yu |
| 2015/0138015 | A1 | 5/2015 | Ishigami et al. |
| 2015/0254986 | A1 | 9/2015 | Fairfield et al. |
| 2015/0286893 | A1 | 10/2015 | Straub et al. |
| 2015/0298676 | A1 | 10/2015 | Matsumura et al. |
| 2016/0103226 | A1 | 4/2016 | Inoue et al. |
| 2016/0257309 | A1 | 9/2016 | Kumar et al. |
| 2016/0318490 | A1 | 11/2016 | Ben Shalom |
| 2016/0325753 | A1 | 11/2016 | Stein et al. |
| 2016/0341558 | A1 | 11/2016 | Lee |
| 2017/0122749 | A1 | 5/2017 | Urano et al. |
| 2017/0349179 | A1 | 12/2017 | Cunningham et al. |
| 2017/0369051 | A1 | 12/2017 | Sakai et al. |
| 2018/0127002 | A1 | 5/2018 | Kim et al. |
| 2018/0130353 | A1* | 5/2018 | Pandurangarao ............ G08G 1/096775 |
| 2018/0141547 | A1 | 5/2018 | Fujiki |
| 2018/0188044 | A1 | 7/2018 | Wheeler et al. |
| 2018/0188046 | A1 | 7/2018 | Akiva et al. |
| 2018/0208199 | A1 | 7/2018 | Fujita et al. |
| 2018/0281854 | A1 | 10/2018 | Talamonti et al. |
| 2019/0019311 | A1 | 1/2019 | Hu et al. |
| 2019/0043273 | A1 | 2/2019 | Cordova et al. |
| 2019/0085967 | A1 | 3/2019 | Morita |
| 2019/0086928 | A1* | 3/2019 | Chen ................. G01C 21/3492 |
| 2019/0113348 | A1 | 4/2019 | Fukushima |
| 2019/0113927 | A1 | 4/2019 | England et al. |
| 2019/0130182 | A1 | 5/2019 | Zang et al. |
| 2019/0186945 | A1 | 6/2019 | Choi et al. |
| 2019/0250626 | A1 | 8/2019 | Ghafarianzadeh et al. |
| 2019/0367021 | A1 | 12/2019 | Zhao et al. |
| 2019/0367022 | A1 | 12/2019 | Zhao et al. |
| 2020/0082614 | A1 | 3/2020 | Xu et al. |
| 2020/0208991 | A1 | 7/2020 | Chen |
| 2020/0209873 | A1 | 7/2020 | Chen |
| 2020/0211370 | A1 | 7/2020 | Chen |
| 2020/0211377 | A1 | 7/2020 | Chen |
| 2020/0242922 | A1 | 7/2020 | Dulberg et al. |
| 2020/0369149 | A1* | 11/2020 | Kassner ................. B60K 35/00 |

FOREIGN PATENT DOCUMENTS

| | | | |
|---|---|---|---|
| CN | 108629963 | 10/2018 | |
| CN | 109085608 | 12/2018 | |
| JP | 2018-106255 | 7/2018 | |
| JP | 2018-197964 | 12/2018 | |
| JP | 2018197964 | * 12/2018 | ............... G08G 1/16 |

OTHER PUBLICATIONS

International Search Report and Written Opinion in International Application No. PCT/US2018/068034, Notification dated Apr. 24, 2019.

International Search Report and Written Opinion in International Application No. PCT/US2018/068035, Notification dated Mar. 29, 2019.

International Search Report and Written Opinion in International Application No. PCT/US2018/068037, Notification dated Mar. 29, 2019.

International Search Report and Written Opinion in International Application No. PCT/US2018/068041, Notification dated Apr. 24, 2019.

* cited by examiner

VEHICLE-BASED ROAD OBSTACLE IDENTIFICATION SYSTEM

INCORPORATION BY REFERENCE TO ANY PRIORITY APPLICATIONS

This application is a continuation of U.S. patent application Ser. No. 16/236,084, entitled "VEHICLE-BASED ROAD OBSTACLE IDENTIFICATION SYSTEM" and filed on Dec. 28, 2018, which is hereby incorporated by reference herein in its entirety. Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like.

SUMMARY

Described herein is a map creation and update framework implemented by a vehicle and/or an external system in communication with the vehicle. For example, a vehicle can include an on-board data processing system that receives sensor data captured by various sensors of the vehicle. As a vehicle travels along a route, the on-board data processing system can process the captured sensor data to identify a potential vehicle stop. The on-board data processing system can then identify geographical coordinates of the location at which the potential vehicle stop occurred, use artificial intelligence (e.g., a trained neural network, a trained machine learning model, etc.) to classify a situation of the vehicle at the potential stop, determine what caused the vehicle to stop using the classification and/or map data, and determine whether the reason for stopping corresponds with an unmarked intersection and/or a location at which vehicles typically yield to oncoming traffic. If the reason for stopping corresponds with an unmarked intersection and/or a location at which vehicles typically yield to oncoming traffic, the on-board data processing system can generate a virtual stop or yield line at the identified geographic coordinates and/or update internal map data accordingly. Furthermore, the vehicle may transmit information corresponding to the virtual stop or yield line (e.g., a location of the virtual stop line, a reason why the virtual stop line was generated, etc.) to the external system (e.g., a network-accessible server).

One or more vehicles may repeat the operations described above one or more times. For example, a vehicle may generate virtual stop or yield line information for a particular location each time the vehicle travels through the location. Thus, for a particular location, the external system may receive virtual stop or yield line information from one or more vehicles, with some or all of the vehicles providing virtual stop or yield line information multiple times. The external system can aggregate or cluster the virtual stop or yield lines generated by the various vehicles for a particular location to identify a representative virtual stop or yield line for that location. The external system can then validate the representative virtual stop or yield line by comparing the representative virtual stop or yield line with existing map data. If the representative virtual stop or yield line is validated, the external system can update maps to include the virtual stop or yield line and transmit the updated maps to one or more vehicles. Thus, on-board and off-board systems can work together to identify unobservable features of a road network and update maps accordingly.

One aspect of the disclosure provides a vehicle comprising a plurality of sensors, where a first sensor in the plurality of sensors is configured to generate velocity data, and where a second sensor in the plurality of sensors is configured to generate location data. The vehicle further comprises a processor configured with computer-executable instructions, where the computer-executable instructions, when executed, cause the processor to: detect a vehicle stop at a first time instant using the generated velocity data; determine a location of the vehicle at the first time instant using the generated location data; determine, using a deep neural network stored on the vehicle, a situation of the vehicle at the determined location; determine, based on at least one of the determined situation or map data, that a cause of the detected vehicle stop is the vehicle arriving at the unmarked intersection; generate virtual stop line data in response to determining that the cause of the detected vehicle stop is the vehicle arriving at an unmarked intersection; and transmit the virtual stop line data to a server over a network via a communication array.

The vehicle of the preceding paragraph can include any sub-combination of the following features: where the location of the vehicle comprises geographical coordinates of the vehicle at the first time instant and a lane on a road in which the vehicle was positioned at the first time instant; where the computer-executable instructions, when executed, further cause the processor to: generate a grid map, apply the grid map as an input to the deep neural network, and determine the situation of the vehicle based on an output of the deep neural network; where the computer-executable instructions, when executed, further cause the processor to: obtain the map data and at least one of light detection and ranging (LiDAR) data, radar data, or camera data, and generate an image in which information derived from the map data is laid over information derived from at least one of the LiDAR data, the radar data, or the camera data to form the grid map; where the computer-executable instructions, when executed, further cause the processor to train the deep neural network using a training set of grid maps; where the computer-executable instructions, when executed, further cause the processor to: detect a second vehicle stop at a second time instant before the first time instant, and determine that a velocity of the vehicle increased by at least a velocity ripple value between the second time instant and the first time instant; where the situation of the vehicle is at least one of whether the vehicle is or is not at an intersection, whether another vehicle is or is not directly in front of the vehicle, whether an object other than the another vehicle is or is not directly in front of the vehicle, whether the vehicle is or is not adjacent to a road marking, whether the vehicle is or is not in the process of turning, whether the vehicle is or is not in the process of changing lanes, whether a bus is or is not present in front of the vehicle and at a bus stop, whether a pedestrian is or is not present behind, in front of, or to the side of the vehicle, whether a bicyclist is or is not present behind, in front of, or to the side of the vehicle, or whether a road hazard is or is not present; and where the vehicle is at least one of an autonomous vehicle, a vehicle that provides one or more driver-assist features, or a vehicle used to offer location-based services.

Another aspect of the disclosure provides a method implemented by a vehicle. The method comprises: detecting a vehicle stop at a first time instant using velocity data measured by the vehicle; determining a location of the vehicle at the first time instant; determining, based in part on execution of an artificial intelligence engine running on the vehicle, that a cause of the detected vehicle stop is the vehicle arriving at an unmarked intersection; generating virtual stop line data in response to determining that the cause of the detected vehicle stop is the vehicle arriving at the unmarked intersection; and transmitting the virtual stop line data to a server over a network.

The method of the preceding paragraph can include any sub-combination of the following features: where the location of the vehicle comprises at least one of geographical coordinates of the vehicle at the first time instant or a lane on a road in which the vehicle was positioned at the first time instant; where determining that a cause of the detected vehicle stop is the vehicle arriving at an unmarked intersection further comprises: generating a grid map, applying the grid map as an input to the artificial intelligence engine, determining a situation of the vehicle based on an output of the artificial intelligence engine, and determining the cause based on at least one of the determined situation or map data; where generating a grip map further comprises: obtaining map data and at least one of light detection and ranging (LiDAR) data, radar data, or camera data, and generating an image in which information derived from the map data is laid over information derived from at least one of the LiDAR data, the radar data, or the camera data to form the grid map; where the artificial intelligence engine is one of a deep neural network or a machine learning model; where the method further comprises training the artificial intelligence engine using a training set of grid maps; where detecting a vehicle stop further comprises: detecting a second vehicle stop at a second time instant before the first time instant, and determining that a velocity of the vehicle increased by at least a velocity ripple value between the second time instant and the first time instant; and where the vehicle is at least one of an autonomous vehicle, a vehicle that provides one or more driver-assist features, or a vehicle used to offer location-based services.

Another aspect of the disclosure provides non-transitory, computer-readable storage media comprising computer executable instructions for identifying a virtual stop line, where the computer-executable instructions, when executed by a vehicle, cause the vehicle to: detect a vehicle stop at a first time instant using velocity data measured by the vehicle; determine a location of the vehicle at the first time instant; determine, based in part on execution of an artificial intelligence engine running on the vehicle, that a cause of the detected vehicle stop is the vehicle arriving at an unmarked intersection; generate virtual stop line data in response to determining that the cause of the detected vehicle stop is the vehicle arriving at the unmarked intersection; and transmit the virtual stop line data external to the vehicle.

The non-transitory, computer-readable storage media of the preceding paragraph can include any sub-combination of the following features: where the location of the vehicle comprises at least one of geographical coordinates of the vehicle at the first time instant or a lane on a road in which the vehicle was positioned at the first time instant; where the computer-executable instructions, when executed, further cause the vehicle to: generate a grid map, apply the grid map as an input to the artificial intelligence engine, determine a situation of the vehicle based on an output of the artificial intelligence engine, and determine the cause based on at least one of the determined situation or map data; and where the artificial intelligence engine is one of a deep neural network or a machine learning model.

Another aspect of the disclosure provides a system comprising a plurality of vehicles. The system further comprises a computing device in communication with the plurality of vehicles over a network, the computing device comprising a processor configured with computer-executable instructions that, when executed, cause the computing device to: obtain first virtual line data from a first vehicle in the plurality of vehicles; obtain second virtual line data from a second vehicle in the plurality of vehicles; aggregate the first virtual line data and the second virtual line data using a statistical analysis; and determine a representative virtual line based on the aggregation of the first virtual line data and the second virtual line data, where the representative virtual line, when incorporated into map data, causes at least some of the vehicles in the plurality of vehicles to operate in accordance with the representative virtual line.

The system of the preceding paragraph can include any sub-combination of the following features: where the first virtual line data is one of first virtual stop line data or first virtual yield line data; where the representative virtual line is one of a representative virtual stop line or a representative virtual yield line; where the computer-executable instructions, when executed, further cause the computing device to select one of a first virtual line corresponding to the first virtual line data or a second virtual line corresponding to the second virtual line data as the representative virtual line; where the representative virtual line corresponds to at least one of a geographic location, a range of geographic locations, or a lane in a road derived from the aggregation of the first virtual line data and the second virtual line data; where the first virtual line data corresponds to a first intersection, and the second virtual line data corresponds to the first intersection; where the first virtual line data corresponds to a first location in the first intersection, and where the second virtual line data corresponds to a second location different than the first location in the first intersection; where the computer-executable instructions, when executed, further cause the computing device to: obtain third virtual line data from the first vehicle, where the first virtual line data and the third virtual line data correspond to a first intersection, and where the first virtual line data and the third virtual line data correspond to different time instants, and aggregate the first virtual line data, the second virtual line data, and the third virtual line data using the statistical analysis; where the first virtual line data corresponds to a first location in the first intersection, and where the third virtual line data corresponds to a second location different than the first location in the first intersection; and where each of the plurality of vehicles is at least one of an autonomous vehicle, a vehicle that provides one or more driver-assist features, or a vehicle used to offer location-based services.

Another aspect of the disclosure provides computer-implemented method comprising: as implemented by one or more computing devices in communication with a first vehicle over a network, obtaining first virtual line data from the first vehicle, where the first virtual line data corresponds to a first time instant and a first intersection; obtaining second virtual line data from the first vehicle, where the second virtual line data corresponds to a second time instant after the first time instant and the first intersection; clustering the first virtual line data and the second virtual line data; and determining a representative virtual line based on the clustering of the first virtual line data and the second virtual line data, where the representative virtual line, when accessed, causes at least one of the first vehicle or another vehicle to operate in accordance with the representative virtual line.

The computer-implemented method of the preceding paragraph can include any sub-combination of the following features: where the first virtual line data is one of first virtual stop line data or first virtual yield line data; where the representative virtual line is one of a representative virtual stop line or a representative virtual yield line; where determining a representative virtual line further comprises selecting one of a first virtual line corresponding to the first virtual line data or a second virtual line corresponding to the second virtual line data to be the representative virtual line; where the representative virtual line, when accessed, causes at least one of the first vehicle or another vehicle to stop at a location corresponding to the representative virtual line; where the first virtual line data corresponds to a first location in the first intersection, and where the second virtual line data corresponds to a second location different than the first location in the first intersection; and where the first vehicle is at least one of an autonomous vehicle, a vehicle that provides one or more driver-assist features, or a vehicle used to offer location-based services.

Another aspect of the disclosure provides non-transitory, computer-readable storage media comprising computer executable instructions for identifying a representative virtual line, where the computer-executable instructions, when executed by a computing system, cause the computing system to: obtain first virtual line data from a first vehicle, where the first virtual line data corresponds to a first time instant; obtain second virtual line data from the first vehicle, where the second virtual line data corresponds to a second time instant after the first time instant; cluster the first virtual line data and the second virtual line data; and determine a representative virtual line based on the clustering of the first virtual line data and the second virtual line data, where the representative virtual line, when accessed, causes at least one of a driver alert to be generated or vehicle operation to commence in accordance with the representative virtual line.

The non-transitory, computer-readable storage media of the preceding paragraph can include any sub-combination of the following features: where the representative virtual line is one of a representative virtual stop line or a representative virtual yield line; and where the driver alert comprises an indication that the first vehicle should stop at a location corresponding to the representative virtual line.

Another aspect of the disclosure provides a system comprising a plurality of vehicles. The system further comprises a computing device in communication with the plurality of vehicles over a network, the computing device comprising a processor configured with computer-executable instructions that, when executed, cause the computing device to: obtain first virtual line data from a first vehicle in the plurality of vehicles; obtain second virtual line data from a second vehicle in the plurality of vehicles; determine a representative virtual line based on the first virtual line data and the second virtual line data; validate the representative virtual line; update map data to incorporate the representative virtual line; and transmit the updated map data to the plurality of vehicles, where the updated map data, when accessed, causes at least some of the vehicles in the plurality of vehicles to operate in accordance with the representative virtual line.

The system of the preceding paragraph can include any sub-combination of the following features: where the first virtual line data is one of first virtual stop line data or first virtual yield line data; where the representative virtual line is one of a representative virtual stop line or a representative virtual yield line; where the computer-executable instructions, when executed, further cause the computing device to: compare the representative virtual line with a marked line present in the map data, determine that the representative virtual line is at least a threshold distance away from the marked line based on the comparison, and validate the representative virtual line based on the determination that the representative virtual line is at least the threshold distance away from the marked line; where the representative virtual line corresponds to at least one of a geographic location, a range of geographic locations, or a lane in a road derived from at least one of the first virtual line data and the second virtual line data; where the first virtual line data corresponds to a first intersection, and the second virtual line data corresponds to the first intersection; where the first virtual line data corresponds to a first location in the first intersection, and where the second virtual line data corresponds to a second location different than the first location in the first intersection; where the computer-executable instructions, when executed, further cause the computing device to: obtain third virtual line data from the first vehicle, where the first virtual line data and the third virtual line data correspond to a first intersection, and where the first virtual line data and the third virtual line data correspond to different time instants, and determine the representative virtual line based on the first virtual line data, the second virtual line data, and the third virtual line data; where the first virtual line data corresponds to a first location in the first intersection, and where the third virtual line data corresponds to a second location different than the first location in the first intersection; and where each of the plurality of vehicles is at least one of an autonomous vehicle, a vehicle that provides one or more driver-assist features, or a vehicle used to offer location-based services.

Another aspect of the disclosure provides a computer-implemented method comprising: as implemented by one or more computing devices in communication with a first vehicle over a network, obtaining first virtual line data from the first vehicle, where the first virtual line data corresponds to a first time instant and a first intersection; obtaining second virtual line data from the first vehicle, where the second virtual line data corresponds to a second time instant after the first time instant and the first intersection; determining a representative virtual line based on the first virtual line data and the second virtual line data; updating map data to incorporate the representative virtual line; and transmitting the updated map data to the first vehicle, where the updated map data, when accessed, causes at least one of the first vehicle or another vehicle to operate in accordance with the representative virtual line.

The computer-implemented method of the preceding paragraph can include any sub-combination of the following features: where the first virtual line data is one of first virtual stop line data or first virtual yield line data; where the representative virtual line is one of a representative virtual stop line or a representative virtual yield line; where the computer-implemented method further comprises determining that a validation of the representative virtual line succeeded; where determining that a validation of the representative virtual line succeeded further comprises: comparing the representative virtual line with a marked line present in the map data, determining that the representative virtual line is at least a threshold distance away from the marked line based on the comparison, and validating the representative virtual line based on the determination that the representative virtual line is at least the threshold distance away from the marked line; where the updated map data, when accessed, causes at least one of the first vehicle or another vehicle to stop at a location corresponding to the representative virtual line; and where the first vehicle is at least one of an autonomous vehicle, a vehicle that provides one or more driver-assist features, or a vehicle used to offer location-based services.

Another aspect of the disclosure provides non-transitory, computer-readable storage media comprising computer executable instructions for editing a map, where the computer-executable instructions, when executed by a computing system, cause the computing system to: obtain first virtual line data from the first vehicle, where the first virtual line data corresponds to a first time instant; obtain second virtual line data from the first vehicle, where the second virtual line data corresponds to a second time instant after the first time instant; determine a representative virtual line based on the first virtual line data and the second virtual line data; update map data to incorporate the representative virtual line; and transmit the updated map data to the first vehicle, where the updated map data, when accessed, causes at least one of an alert to be generated for display in the first vehicle or operation of the first vehicle to commence in accordance with the representative virtual line.

The non-transitory, computer-readable storage media of the preceding paragraph can include any sub-combination of the following features: where the representative virtual line is one of a representative virtual stop line or a representative virtual yield line; and where the alert comprises an indication that the first vehicle should stop at a location corresponding to the representative virtual line.

Another aspect of the disclosure provides a vehicle comprising a first sensor configured to generate velocity data. The vehicle further comprises: a processor configured with computer-executable instructions, where the computer-executable instructions, when executed, cause the processor to: identify, based on the velocity data, a trough in a plurality of velocity values, where the trough occurs at a first time instant; determine that a first velocity value in the plurality of velocity values that corresponds to the first time instant is below a velocity threshold value; determine that a prior vehicle stop occurred at a second time instant that is less than a threshold time before the first time instant; determine that a velocity of the vehicle increased by at least a velocity ripple value between the second time instant and the first time instant; and detect a second vehicle stop at the first time instant in response to the determination that the velocity of the vehicle increased by at least the velocity ripple value between the second time instant and the first time instant.

The vehicle of the preceding paragraph can include any sub-combination of the following features: where the prior vehicle stop corresponds to a second trough in the plurality of velocity values, where the second trough corresponds to the second time instant; the second trough corresponds to a second velocity value in the plurality of velocity values, and where a difference between a third velocity value in the plurality of velocity values corresponding to a third time instant between the first and second time instants and the second velocity value is greater than the velocity ripple value; where the computer-executable instructions, when executed, further cause the processor to: identify, based on the velocity data, a second trough in the plurality of velocity values, where the second trough occurs at a third time instant after the first time instant, determine that a second velocity value in the plurality of velocity values that corresponds to the third time instant is above the velocity threshold value, and determine that a third vehicle stop did not occur at the third time instant; where the computer-executable instructions, when executed, further cause the processor to: identify, based on the velocity data, a second trough in the plurality of velocity values, where the second trough occurs at a third time instant after the first time instant, determine that a second velocity value in the plurality of velocity values that corresponds to the third time instant is below the velocity threshold value, determine that the second vehicle stop occurred more than the threshold time before the third time instant, and detect a third vehicle stop at the third time instant; where the computer-executable instructions, when executed, further cause the processor to: identify, based on the velocity data, a second trough in the plurality of velocity values, where the second trough occurs at a third time instant after the first time instant, determine that a second velocity value in the plurality of velocity values that corresponds to the third time instant is below the velocity threshold value, determine that the second vehicle stop occurred within the threshold time of the third time instant, determine that a velocity of the vehicle did not increase by at least the velocity ripple value between the first time instant and the third time instant, and determine that a third vehicle stop did not occur at the third time instant; where the first sensor is one of a radar sensor, a speedometer, an accelerometer, a camera, a light detection and ranging (LiDAR) sensor, or a global positioning system (GPS); and where the vehicle is at least one of an autonomous vehicle, a vehicle that provides one or more driver-assist features, or a vehicle used to offer location-based services.

Another aspect of the disclosure provides a method implemented by a vehicle. The method comprises: obtaining velocity data from a first sensor coupled to or embedded within the vehicle; determining, based on the velocity data, that a first velocity value corresponding to a first time instant is below a velocity threshold value; determining that a prior vehicle stop occurred at a second time instant that is less than a threshold time before the first time instant; determining that a velocity of the vehicle increased by at least a velocity ripple value between the second time instant and the first time instant; and detecting a second vehicle stop at the first time instant in response to the determination that the velocity of the vehicle increased by at least the velocity ripple value between the second time instant and the first time instant.

The method of the preceding paragraph can include any sub-combination of the following features: where the prior vehicle stop corresponds to a second velocity value, where the second velocity value is at a trough of velocity values; where a difference between a third velocity value corresponding to a third time instant between the first and second time instants and the second velocity value is greater than the velocity ripple value; where the method further comprises: identifying, based on the velocity data, a second velocity value corresponding to a third time instant after the first time instant, determining that the second velocity value is above the velocity threshold value, and determining that a third vehicle stop did not occur at the third time instant; where the method further comprises: identifying, based on the velocity data, a second velocity value corresponding to a third time instant after the first time instant, determining that the second velocity value is below the velocity threshold value, determining that the second vehicle stop occurred more than the threshold time before the third time instant, and detecting a third vehicle stop at the third time instant; where the method further comprises: identifying, based on the velocity data, a second velocity value corresponding to a third time instant after the first time instant, determining that the second velocity value is below the velocity threshold value, determining that the second vehicle stop occurred within the threshold time of the third time instant, determining that a velocity of the vehicle did not increase by at least the velocity ripple value between the first time instant and the third time instant, and determining that a third vehicle stop did not occur at the third time instant; where the first sensor is one of a radar sensor, a speedometer, an accelerometer, a camera, a light detection and ranging (LiDAR) sensor, or a global positioning system (GPS); and where the vehicle is at least one of an autonomous vehicle, a vehicle that provides one or more driver-assist features, or a vehicle used to offer location-based services.

Another aspect of the disclosure provides non-transitory, computer-readable storage media comprising computer executable instructions for detecting a stop, where the computer-executable instructions, when executed by a vehicle, cause the vehicle to: determine, based on velocity data obtained from a first sensor of the vehicle, that a first velocity value corresponding to a first time instant is below a velocity threshold value; determine that a prior vehicle stop occurred at a second time instant that is less than a threshold time before the first time instant; determine that a velocity of the vehicle increased by at least a velocity ripple value between the second time instant and the first time instant; and detect a second vehicle stop at the first time instant in response to the determination that the velocity of the vehicle increased by at least the velocity ripple value between the second time instant and the first time instant.

The non-transitory, computer-readable storage media of the preceding paragraph can include any sub-combination of the following features: where the computer-executable instructions, when executed, further cause the vehicle to: identify, based on the velocity data, a second velocity value corresponding to a third time instant after the first time instant, determine that the second velocity value is above the velocity threshold value, and determine that a third vehicle stop did not occur at the third time instant; where the computer-executable instructions, when executed, further cause the vehicle to: identify, based on the velocity data, a second velocity value corresponding to a third time instant after the first time instant, determine that the second velocity value is below the velocity threshold value, determine that the second vehicle stop occurred more than the threshold time before the third time instant, and detect a third vehicle stop at the third time instant; and where the computer-executable instructions, when executed, further cause the vehicle to: identify, based on the velocity data, a second velocity value corresponding to a third time instant after the first time instant, determine that the second velocity value is below the velocity threshold value, determine that the second vehicle stop occurred within the threshold time of the third time instant, determine that a velocity of the vehicle did not increase by at least the velocity ripple value between the first time instant and the third time instant, and determine that a third vehicle stop did not occur at the third time instant.

Another aspect of the disclosure provides a vehicle comprising a plurality of sensors, where a first sensor in the plurality of sensors is configured to generate velocity data, and where a second sensor in the plurality of sensors is configured to generate location data. The vehicle further comprises a processor configured with computer-executable instructions, where the computer-executable instructions, when executed, cause the processor to: detect a vehicle stop at a first time instant using the generated velocity data; determine a location of the vehicle at the first time instant using the generated location data; determine, using a deep neural network stored on the vehicle, a situation of the vehicle at the determined location; determine, based on at least one of the determined situation or map data, that a cause of the detected vehicle stop is a road obstacle; generate virtual stop line data in response to determining that the cause of the detected vehicle stop is the road obstacle, where the virtual stop line data comprises an indication of a hidden problem at the determined location; and transmit the virtual stop line data to a server over a network via a communication array.

The vehicle of the preceding paragraph can include any sub-combination of the following features: where the location of the vehicle comprises geographical coordinates of the vehicle at the first time instant and a lane on a road in which the vehicle was positioned at the first time instant; where the computer-executable instructions, when executed, further cause the processor to: generate a grid map, apply the grid map as an input to the deep neural network, and determine the situation of the vehicle based on an output of the deep neural network; where the computer-executable instructions, when executed, further cause the processor to: obtain the map data and at least one of light detection and ranging (LiDAR) data, radar data, or camera data, and generate an image in which information derived from the map data is laid over information derived from at least one of the LiDAR data, the radar data, or the camera data to form the grid map; where the computer-executable instructions, when executed, further cause the processor to train the deep neural network using a training set of grid maps; where the computer-executable instructions, when executed, further cause the processor to: detect a second vehicle stop at a second time instant before the first time instant, and determine that a velocity of the vehicle increased by at least a velocity ripple value between the second time instant and the first time instant; where the road obstacle comprises at least one of a speed bump, a gutter, an unmarked crosswalk, a pothole, a road flare, a traffic cone, a detour sign, or an uneven surface; and where the vehicle is at least one of an autonomous vehicle, a vehicle that provides one or more driver-assist features, or a vehicle used to offer location-based services.

Another aspect of the disclosure provides a method implemented by a vehicle. The method comprises: detecting a vehicle stop at a first time instant using velocity data measured by the vehicle; determining a location of the vehicle at the first time instant; determining, based in part on execution of an artificial intelligence engine running on the vehicle, that a cause of the detected vehicle stop is a road obstacle; generating virtual stop line data in response to determining that the cause of the detected vehicle stop is the road obstacle, where the virtual stop line data comprises an indication of a hidden danger at the determined location; and transmitting the virtual stop line data to a server over a network.

The method of the preceding paragraph can include any sub-combination of the following features: where the method further comprises operating in a sensitive mode at the determined location in response to accessing map data incorporating information derived from the virtual stop line data; where determining that a cause of the detected vehicle stop is road obstacle further comprises: generating a grid map, applying the grid map as an input to the artificial intelligence engine, determining a situation of the vehicle based on an output of the artificial intelligence engine, and determining the cause based on at least one of the determined situation or map data; where generating a grip map further comprises: obtaining map data and at least one of light detection and ranging (LiDAR) data, radar data, or camera data, and generating an image in which information derived from the map data is laid over information derived from at least one of the LiDAR data, the radar data, or the camera data to form the grid map; where the artificial intelligence engine is one of a deep neural network or a machine learning model; where the road obstacle comprises at least one of a speed bump, a gutter, an unmarked crosswalk, a pothole, a road flare, a traffic cone, a detour sign, or an uneven surface; where detecting a vehicle stop further comprises: detecting a second vehicle stop at a second time instant before the first time instant, and determining that a velocity of the vehicle increased by at least a velocity ripple value between the second time instant and the first time instant; and where the vehicle is at least one of an autonomous vehicle, a vehicle that provides one or more driver-assist features, or a vehicle used to offer location-based services.

Another aspect of the disclosure provides non-transitory, computer-readable storage media comprising computer executable instructions for identifying a virtual stop line, where the computer-executable instructions, when executed by a vehicle, cause the vehicle to: detect a vehicle stop at a first time instant using velocity data measured by the vehicle; determine a location of the vehicle at the first time instant; determine, based in part on execution of an artificial intelligence engine running on the vehicle, that a cause of the detected vehicle stop is a road obstacle; generate virtual stop line data in response to determining that the cause of the detected vehicle stop is the road obstacle, where the virtual stop line data comprises an indication of a hidden danger at the determined location; and transmit the virtual stop line data external to the vehicle.

The non-transitory, computer-readable storage media of the preceding paragraph can include any sub-combination of the following features: where the computer-executable instructions, when executed, further cause the vehicle to operate in a sensitive mode at the determined location in response to accessing map data incorporating information derived from the virtual stop line data; where the computer-executable instructions, when executed, further cause the vehicle to: generate a grid map, apply the grid map as an input to the artificial intelligence engine, determine a situation of the vehicle based on an output of the artificial intelligence engine, and determine the cause based on at least one of the determined situation or map data; and where the artificial intelligence engine is one of a deep neural network or a machine learning model.

DETAILED DESCRIPTION

Figure 1A:
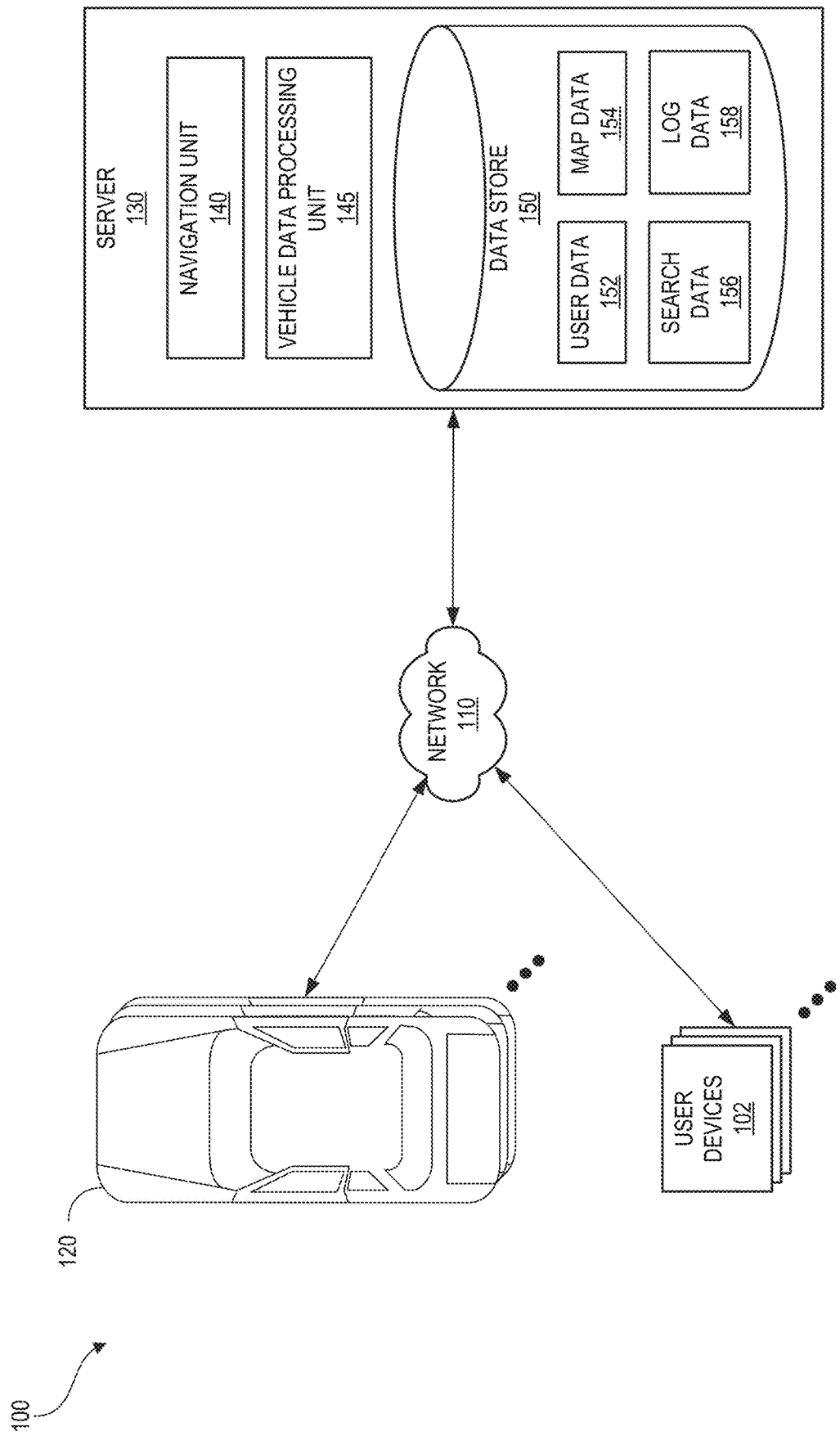
FIG. 1A illustrates a block diagram of a networked vehicle environment in which one or more vehicles and/or one or more user devices interact with a server via a network, according to one embodiment.

As described above, vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, a vehicle can obtain sensor data to capture features of a road network. The vehicle or an external system can then use the captured road network features to update maps (e.g., 2D and/or 3D geographic maps, such as road maps, terrain maps, etc.) for use by vehicles in the future to aid with navigation, driving, and/or maneuvering.

However, the vehicle may only be able to capture features of a road network that are observable. For example, crosswalks, intersection stop lines, and/or other painted road markings are observable features of a road network that can be captured and converted into data for updating maps. Other features of a road network may be unobservable, such as locations at which vehicles stop in an unmarked intersection or the proper positions for vehicles to wait to yield to merging and/or oncoming traffic. While unobservable, it may be desirable that these features be incorporated into maps to aid with vehicle navigation, driving, and/or maneuvering. In particular, incorporating these unobservable features into maps may help vehicles avoid collisions, avoid unnecessary stops, conserve fuel, and/or the like.

A user may attempt to manually label a map to incorporate unobservable features. However, an appropriate position for a vehicle to stop at an unmarked intersection or before merging with traffic may be dependent on various factors that are only observable by a vehicle at the location of the unmarked intersection or yielding area. Such factors can include the density of vehicle traffic at the location, the speed at which oncoming vehicles typically travel, a number of pedestrians that are typically present, whether oncoming traffic is sufficiently visible to make a decision on whether to proceed or remain in a stopped state (e.g., whether trees, buildings, or other objects are obstructing a view of oncoming traffic), whether road hazards (e.g., potholes, construction, uneven surfaces, etc.) are present and/or the location of such hazards, and/or the like. Simply looking at and labeling a map is not practical and could lead to collisions if relied upon by vehicles in the future.

Accordingly, described herein is a map creation and update framework implemented by a vehicle and/or an external system in communication with the vehicle. For example, a vehicle can include an on-board data processing system that receives sensor data captured by various sensors of the vehicle. As a vehicle travels along a route, the on-board data processing system can process the captured sensor data to identify a potential vehicle stop (e.g., an event at which a vehicle is traveling at less than a threshold velocity for at least a threshold period of time). The on-board data processing system can then identify geographical coordinates of the location at which the potential vehicle stop occurred, use artificial intelligence (e.g., a trained neural network, a trained machine learning model, etc.) to classify a situation of the vehicle at the potential stop, determine what caused the vehicle to stop using the classification and/or map data, and determine whether the reason for stopping corresponds with an unmarked intersection and/or a location at which vehicles typically yield to oncoming traffic. If the reason for stopping corresponds with an unmarked intersection and/or a location at which vehicles typically yield to oncoming traffic, the on-board data processing system can generate a virtual stop or yield line at the identified geographic coordinates and/or update or edit internal map data accordingly. Furthermore, the vehicle may transmit information corresponding to the virtual stop or yield line (e.g., a location of the virtual stop line, a reason why the virtual stop line was generated, etc.) to the external system (e.g., a network-accessible server).

One or more vehicles may repeat the operations described above one or more times. For example, a vehicle may generate virtual stop or yield line information for a particular location each time the vehicle travels through the location. Thus, for a particular location, the external system may receive virtual stop or yield line information from one or more vehicles, with some or all of the vehicles providing virtual stop or yield line information multiple times. The external system can aggregate or cluster the virtual stop or yield lines generated by the various vehicles for a particular location to identify a representative virtual stop or yield line for that location. The external system can then validate the representative virtual stop or yield line by comparing the representative virtual stop or yield line with existing map data. If the representative virtual stop or yield line is validated, the external system can update or edit maps to include the virtual stop or yield line and transmit the updated maps to one or more vehicles. Thus, on-board and off-board systems can work together to identify unobservable features of a road network and update maps accordingly.

The map creation and update framework described herein can not only improve vehicle navigation, driving, and/or maneuvering by incorporating unobservable road network features into maps used by vehicles, but the framework can also reduce network congestion and protect the privacy of location-sensitive data. For example, sensors of a vehicle may capture sensor data often (e.g., every 1 ms, every 5 ms, etc.), and therefore the amount of raw sensor data captured by a vehicle and used for identifying a virtual stop or yield line can be very large (e.g., in the gigabytes, in the terabytes, etc.). Rather than transmitting the raw sensor data to the external system for processing, the vehicle can instead process the raw sensor data internally and simply transmit an output (e.g., the location of a potential virtual stop or yield line) to the external system. Thus, the amount of data transmitted by the vehicle over a network is significantly reduced. In addition, the raw sensor data may include sensitive user data, such as user location, driving habits, etc. By processing the raw sensor data and simply transmitting an output of the processing, the vehicle can preserve the privacy of the sensitive user data.

Detailed descriptions and examples of systems and methods according to one or more illustrative embodiments of the present disclosure may be found in the section entitled Updating Maps Using Virtual Stop and Yield Lines, as well as in the section entitled Example Embodiments, and also in FIGS. 2 through 11 herein. Furthermore, components and functionality for the map creation and update framework described herein may be configured and/or incorporated into the networked vehicle environment 100 described herein in FIGS. 1A-1B.

Various embodiments described herein are intimately tied to, enabled by, and would not exist except for, computer technology. For example, the map creation and update framework described herein in reference to various embodiments cannot reasonably be performed by humans alone, without the vehicle and computer technology upon which they are implemented.

Networked Vehicle Environment

FIG. 1A illustrates a block diagram of a networked vehicle environment 100 in which one or more vehicles 120 and/or one or more user devices 102 interact with a server 130 via a network 110, according to one embodiment. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. In the embodiment, a user device 102 executes an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. In some embodiments, the server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
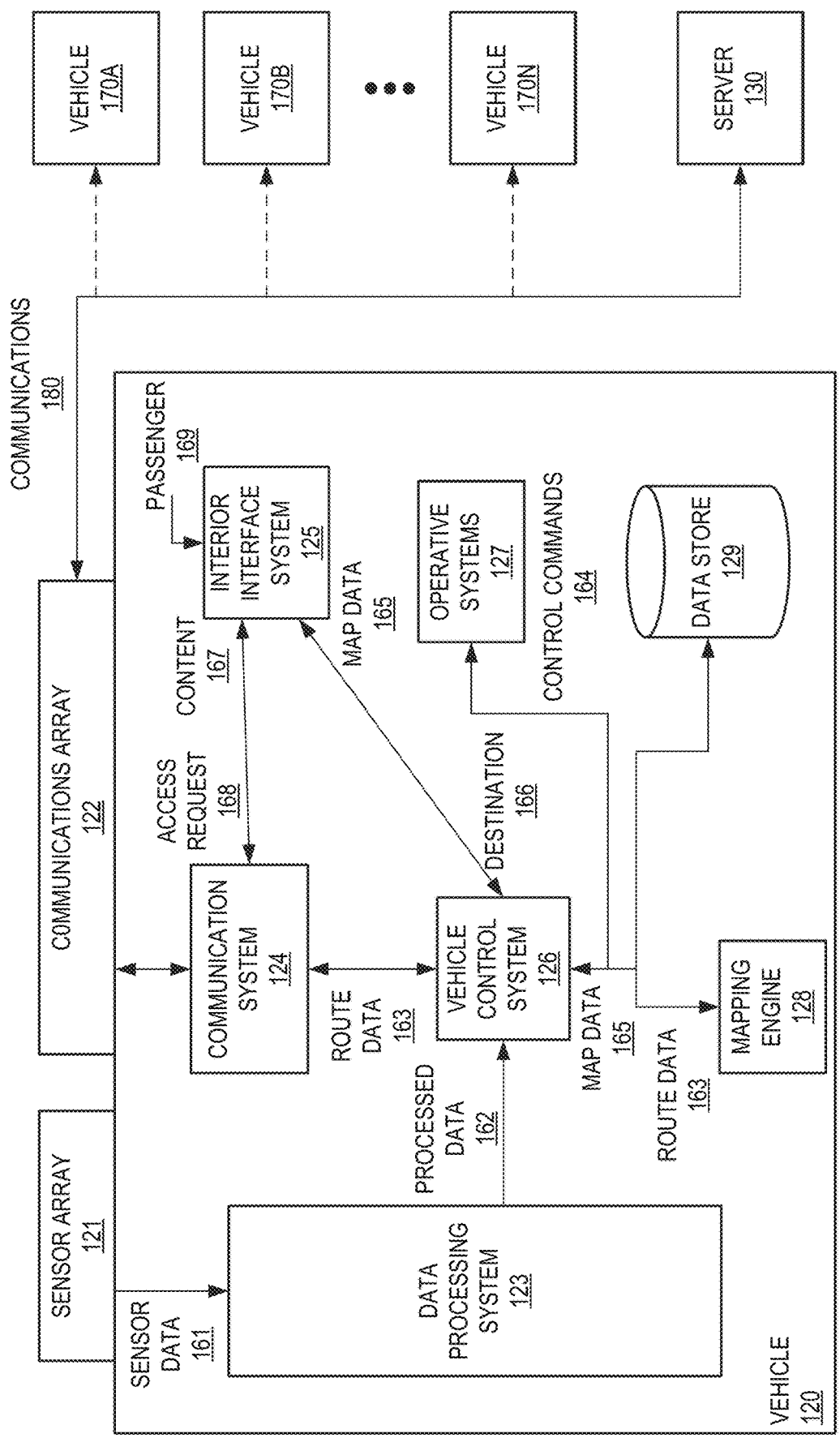
FIG. 1B illustrates a block diagram showing the vehicle of FIG. 1A in communication with one or more other vehicles and/or the server of FIG. 1A, according to one embodiment.

FIG. 1B illustrates a block diagram showing the vehicle 120 of FIG. 1A in communication with one or more other vehicles 170A-N and/or the server 130 of FIG. 1A, according to one embodiment. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. In some embodiments, the vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). In some embodiments, the vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Updating Maps Using Virtual Stop and Yield Lines

As described above, on-board and/or off-board systems can work in conjunction to identify unobservable features of a road network and update maps accordingly. For example, the data processing system 123 of the vehicle 120 and the vehicle data processing unit 145 of the server 130 can communicate with each other to identify unobservable features of a road network and update maps accordingly.

Figure 2:
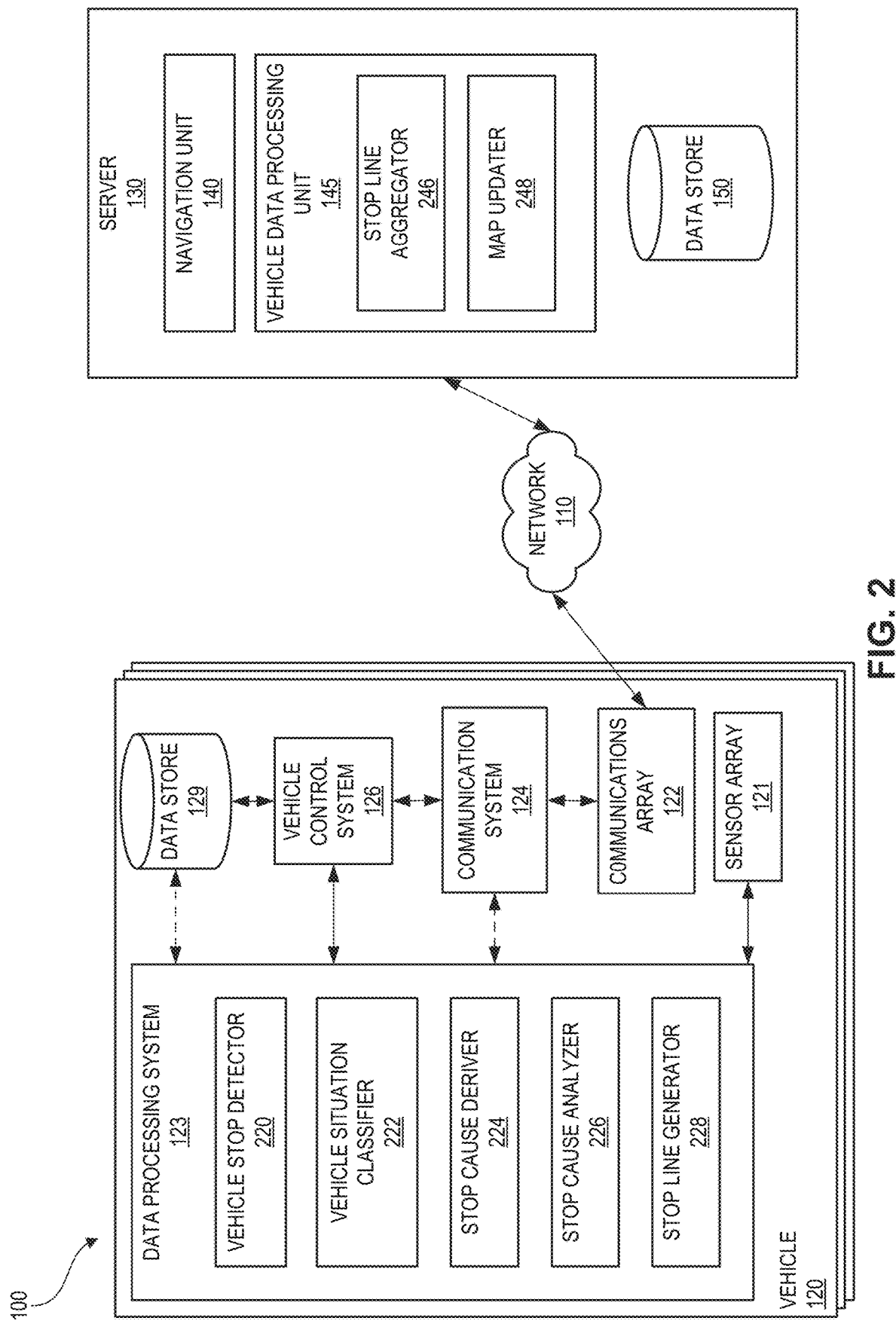
FIG. 2 illustrates a block diagram of the networked vehicle environment of FIG. 1A in which the vehicle generates virtual stop or yield lines and the server aggregates multiple virtual stop or yield lines to identify a representative virtual stop or yield line, according to one embodiment.

FIG. 2 illustrates a block diagram of the networked vehicle environment 100 in which the vehicle 120 generates virtual stop or yield lines and the server 130 aggregates multiple virtual stop or yield lines to identify a representative virtual stop or yield line, according to one embodiment. As illustrated in FIG. 2, the data processing system 123 of the vehicle 120 includes various components to implement some or all of the functionality described herein. For example, the data processing system 123 can include a vehicle stop detector 220, a vehicle situation classifier 222, a stop cause deriver 224, a stop cause analyzer 226, and a stop line generator 228. Furthermore, the vehicle data processing unit 145 of the server 130 includes various components to implement some or all of the functionality described herein. For example, the vehicle data processing unit 145 can include a stop line aggregator 246 and a map updater 248.

The vehicle stop detector 220 may be configured to detect a possible occurrence of an actual vehicle stop (e.g., a stop occurring as a result of a traffic light, stop sign, pedestrian crossing, yielding zone, and/or any other set location at which a vehicle stop is sometimes or always required). Typically, it is difficult to identify whether a vehicle has actually stopped because of variations in driver behavior. For example, an actual stop cannot simply be defined as an event during which a vehicle comes to a complete stop (e.g., the vehicle is not moving (e.g., traveling at 0 mph, 0 m/s, etc.) for at least a threshold period of time). While some drivers may maneuver a vehicle to a complete stop at a traffic light, stop sign, or other set location at which a stop is sometimes or always required, other drivers may slow the vehicle down, but not come to a complete stop. For example, these drivers may slow the vehicle to a velocity within a threshold velocity of 0 mph, 0 m/s, etc. for a brief moment and then begin accelerating. A driver may slow a vehicle in this manner at an unmarked intersection and/or when preparing to merge into oncoming traffic, and therefore this slowing action should be considered an actual stop. However, a driver also may slow a vehicle in this manner in stop-and-go traffic (e.g., traffic in which vehicles repeatedly accelerate and decelerate within short distances), and therefore this slowing action should not be considered an actual stop.

The vehicle stop detector 220 can use sensor data provided by the sensor array 121 to identify stops that should be considered actual stops and stops that should not be considered actual stops. For example, the vehicle stop detector 220 can obtain vehicle velocity information for the vehicle 120 from a speedometer, an accelerometer, a radar sensor, a LiDAR sensor, a camera, a GPS, and/or any other sensor comprised within the sensor array 121 that can measure vehicle velocity or data that can be used to derive vehicle velocity. The vehicle velocity information may include (or be used to derive) vehicle velocity values measured over a period of time and/or distances. For example, the vehicle velocity information can form an ego vehicle velocity profile.

The vehicle stop detector 220 can analyze the vehicle velocity information to detect an actual stop. For example, the vehicle stop detector 220 can identify a first time instant (e.g., a time and/or date) at which the vehicle 120 velocity falls below a velocity threshold value (e.g., 5 mph, 10 mph, etc.) and is at a lowest value within a threshold time range (e.g., 5 seconds, 10 seconds, 30 seconds, etc.) surrounding the time instant. The vehicle stop detector 220 can then identify whether a second time instant exists before the first time instant at which the vehicle 120 velocity also falls below the velocity threshold value and is at a lowest value within a threshold time range surrounding the second time instant. If no such second time instant exists, the vehicle stop detector 220 determines that the first time instant corresponds to an actual stop. If such a second time instant exists, the vehicle stop detector 220 determines whether the second time instant is within a threshold time (e.g., 5 seconds, 10 seconds, 30 seconds, 1 minute, etc.) of the first time instant and/or whether the vehicle 120 velocity increased by a second velocity threshold value (e.g., 10 mph, 15 mph, etc., also referred to herein as a velocity ripple value) between the second time instant and the first time instant. If the second time instant is within the threshold time of the first time instant or the vehicle 120 velocity did not increase by the second velocity threshold value between the second and first time instants, then the vehicle stop detector 220 determines that the first time instant does not correspond to an actual stop. Rather, the first time instant may be part of an actual stop corresponding to the second time instant. Otherwise, if the second time instant is not within the threshold time of the first time instant and/or the vehicle 120 velocity increased by at least the second velocity threshold value between the second and time instants, then the vehicle stop detector 220 determines that the first time instant does correspond to an actual stop (and/or a stop corresponding to the second time instant may be a separate stop). If the vehicle stop detector 220 determines that the first time instant corresponds to an actual stop, the vehicle stop detector 220 can identify the geographic coordinates of the vehicle 120 and/or the lane in which the vehicle 120 is present at the first time instant (e.g., by obtaining GPS data from the sensor array 121) and provide the geographic coordinates, lane identification, and/or first time instant to the vehicle situation classifier 222. Graphs depicting various situations that may or may not be considered actual stops are described in greater detail below with respect to FIGS. 5A-5B.

The vehicle situation classifier 222 can use artificial intelligence to determine a situation of the vehicle 120 at the geographic coordinates provided by the vehicle stop detector 220. For example, the vehicle situation classifier 222 can provide a grid map as an input to a trained deep neural network (or a trained machine learning model), and the trained deep neural network may produce an output indicating the situation of the vehicle 120 at the geographic coordinates. The grid map may be an image overlaid with different information. The information can include a map layout at the provided geographic coordinates, identified lane, and/or the first time instant (e.g., map data that identifies lanes, roads, etc., also referred to herein as a horizon layer), a LiDAR scan of an area surrounding the vehicle 120 at the provided geographic coordinates, identified lane, and/or the first time instant (also referred to herein as an occupancy layer), data indicating which area is free space and which area is not free space in the area surrounding the vehicle 120 at the provided geographic coordinates, identified lane, and/or the first time instant (which can be derived from radar data, LiDAR data, camera data, etc., also referred to herein as a semantics layer), and/or velocity data at the provided geographic coordinates, identified lane, and/or the first time instant (which can be derived from radar data, also referred to herein as a velocity layer). The horizon, occupancy, semantics, and velocity layer can be coded different colors and overlay each other to form the grid map. Alternatively, some or all of the layers can be separated and be provided separately as inputs to the trained deep neural network.

A vehicle situation output by the trained deep neural network may be a traffic scene surrounding the vehicle 120 at the provided geographical coordinates, identified lane, and/or the first time instant. For example, a vehicle situation can include whether the vehicle 120 is or is not at an intersection, whether another vehicle is or is not directly in front of the vehicle 120 (e.g., within a threshold distance of the vehicle 120, such as within 2 m, 5 m, 10 m, etc., where the other vehicle may be referred to as a leading vehicle), whether another vehicle is or is not near (e.g., within 2 m, 5 m, 10 m, or some other threshold distance) the vehicle 120 and traveling in a different direction than the vehicle 120, whether an object other than another vehicle is or is not directly in front of the vehicle 120, whether the vehicle 120 is or is not close to a road marking (e.g., within 2 m, 5 m, 10 m, or some other threshold distance of the road marking, such as a stop line, a yield line, a crosswalk, etc.), whether the vehicle 120 is or is not in the process of turning, whether the vehicle 120 is or is not in the process of changing lanes, whether a bus is or is not present in front of the vehicle 120 and at a bus stop, whether a pedestrian is or is not present behind, in front of, and/or to the side of the vehicle 120, whether a bicyclist is or is not present behind, in front of, and/or to the side of the vehicle 120, whether a vehicle collision or other road hazard (e.g., debris, vehicle with a flat tire, snow, ice, hail, water, oil, fallen tree, downed power lines, water main break, road flares, traffic cones, detour signs, low ambient light and/or reduced vision due to weather conditions, etc.) is or is not present near (e.g., within 2 m, 5 m, 10 m, or some other threshold distance) the vehicle 120, and/or the like.

The vehicle situation classifier 222 and/or the server (e.g., the vehicle data processing unit 145) may train the deep neural network using one or more grid maps in a training set. For example, grid maps in the training set may correspond to locations, lanes, and/or time instants in which vehicles were stopped at an intersection; locations, lanes, and/or time instants in which vehicles were stopped, but not at an intersection; locations, lanes, and/or time instants in which vehicles were stopped behind a leading vehicle; locations, lanes, and/or time instants in which vehicles were stopped, but not behind a leading vehicle; locations, lanes, and/or time instants in which vehicles were stopped behind an object other than a vehicle; locations, lanes, and/or time instants in which vehicles were stopped, but not behind a leading vehicle or an object other than a vehicle; locations, lanes, and/or time instants in which vehicles were stopped close to a road marking; locations, lanes, and/or time instants in which vehicles were stopped, but not close to a road marking; and/or the like. The grid maps in the training set may be labeled or otherwise marked to indicate the vehicle situation(s) corresponding to the respective grid maps.

The vehicle situation classifier 222 can provide an indication of the vehicle situation to the stop cause deriver 224. The stop cause deriver 224 can use the provided vehicle situation and/or map data 165 to determine a cause of the vehicle 120 stop. For example, the stop cause deriver 224 can determine that the vehicle 120 stopped because of a painted stop line at an intersection based on the map data 165 and/or the vehicle situation. As an illustrative example, the map data 165 may include geographic coordinates of the painted stop line, and the stop cause deriver 224 can determine that the geographic coordinates of the actual stop are before the geographic coordinates of the painted stop line along the vehicle 120 path using the map data 165. As another illustrative example, the map data 165 may include geographic coordinates of the painted stop line and the vehicle situation may indicate that the vehicle 120 is at an intersection, and the stop cause deriver 224 can determine that the geographic coordinates of the actual stop are after the geographic coordinates of the painted stop line along the vehicle 120 path using the map data 165, but that the stop occurred at an intersection using the provided vehicle situation. As another example, the stop cause deriver 224 can determine that the vehicle 120 stopped independently at a possible unmarked intersection and/or to yield to oncoming traffic if the vehicle situation indicates that the stop did not occur close to a road marking and the vehicle 120 was not behind a leading vehicle. As another example, the stop cause deriver 224 can determine that the vehicle 120 stopped because of traffic congestion at a location other than an intersection if the vehicle situation indicates that the stop did not occur at an intersection and/or the vehicle 120 was behind a leading vehicle. The stop cause deriver 224 can determine any number of types of causes for a vehicle 120 stopping.

Optionally, the stop cause deriver 224 can use artificial intelligence to determine the cause of a vehicle 120 stop. For example, a neural network and/or machine learning model can be trained by the stop cause deriver 224 and/or the vehicle data processing unit 145 to output vehicle 120 stop causes based on vehicle situations and/or map data 165 provided as inputs to the neural network and/or machine learning model.

The stop cause deriver 224 can provide an indication of the cause of the vehicle 120 stop to the stop cause analyzer 226. The stop cause analyzer 226 can evaluate the indicated cause and discard any actual stops that were caused by anything other than a possible unmarked intersection and/or yielding to oncoming traffic. For example, the stop cause analyzer 226 can discard an actual stop caused by a leading vehicle not at an intersection. If the stop cause analyzer 226 determines that the cause of the vehicle 120 stop was because of a possible unmarked intersection and/or yielding to oncoming traffic, the stop cause analyzer 226 can provide the actual stop data (e.g., geographic coordinates of the actual stop, a lane in which the actual stop occurred, a time instant at which the actual stop occurred, etc.) to the stop line generator 228.

The stop line generator 228 can generate a virtual stop or yield line using the actual stop data. For example, the stop line generator 228 can generate virtual stop or yield line data that indicates a geographic location and/or lane at which a vehicle 120 should stop. The stop line generator 228 can optionally update the map data 165 to include the virtual stop or yield line data. For example, inclusion of the virtual stop or yield line data into the map data 165 may cause the map data 165 to include a graphical line representing the virtual stop or yield line at the geographic location and/or lane where a vehicle 120 should stop. The stop line generator 228 can also transmit the virtual stop or yield line data to the stop line aggregator 246. The stop line generator 228 may provide the virtual stop or yield line data to the communications array 122 via the vehicle control system and communication system 124 for transmission over the network 110. Alternatively, the stop line generator 228 may provide the virtual stop or yield line data to the communications array 122 via the communication system 124.

The stop line aggregator 246 may receive virtual stop or yield line data from one or more vehicles 120. For example, for a particular location, one vehicle 120 may provide virtual stop or yield line data, one vehicle 120 may provide multiple instances of the virtual stop or yield line data (e.g., new virtual stop or yield line data may be generated by the vehicle 120 each time the vehicle 120 passes through the corresponding geographic coordinates), multiple vehicles 120 may each provide virtual stop or yield line data, and/or any combination thereof. The stop line aggregator 246 can cluster the virtual stop or yield lines generated by one of more of the vehicles 120 to identify a representative virtual stop or yield line. For example, the stop line aggregator 246 can average the locations of the virtual stop or yield lines generated by the vehicle(s) 120 and set the average location to be the location of the representative virtual stop or yield line. As another example, the stop line aggregator 246 can identify the most common location for a virtual stop or yield line and set the most common location to be the location of the representative virtual stop or yield line. As another example, the stop line aggregator 246 can identify the median virtual stop or yield line location and set the median location to be the location of the representative virtual stop or yield line. Once the location (e.g., geographic coordinates and/or lane) of the representative virtual stop or yield line is set, the stop line aggregator 246 can provide an indication of the representative virtual stop or yield line to the map updater 248.

The map updater 248 optionally performs a validation operation by cross-referencing the representative virtual stop or yield line with the map data 154. In particular, the map updater 248 can determine whether a marked stop or yield line exists near the location of the representative virtual stop or yield line (e.g., the marked stop or yield line is within 2 m, 5 m, 10 m, or some other threshold distance of the location of the representative virtual stop or yield line and/or in the same lane as the representative virtual stop or yield line). If the representative virtual stop or yield line is near a marked stop or yield line, the map updater 248 may not update or edit the map data 154 to include the representative virtual stop or yield line because the representative virtual stop or yield line may be redundant of the marked stop or yield line. On the other hand, if the representative virtual stop or yield line is not near a marked stop or yield line, the map updater 248 may update or edit the map data 154 to include the representative virtual stop or yield line.

If the map data 154 is updated, the map updater 248 can store the updated map data 154 in the data store 150. The map updater 248 can also transmit the updated map data 154 to one or more of the vehicles 120 for storage and use by the vehicle 120 components. For example, the map updater 248 can transmit the updated map data 154 to the stop line generator 228 (via the communications array 122, communication system 124, and/or vehicle control system 126), and the stop line generator 228 can store the updated map data 154 in the data store 129 (directly or via the vehicle control system 126) to replace the originally stored map data 165. The vehicle control system 126, the interior interface system 125, the mapping engine 128, and/or other components of the vehicle 120 can then rely on the updated map data 154, 165 to improve ride-sharing services (e.g., improve navigation instructions presented to the driver, such as indicating where to stop or yield), to assist drivers in driving and/or maneuvering the vehicle 120, and/or to automatically drive and/or maneuver the vehicle 120.

Thus, vehicle(s) 120 and/or the vehicle data processing unit 145 can implement a self-healing map process in which vehicle(s) 120 detect unobservable road network features and provide suggested virtual stop or yield lines to the vehicle data processing unit 145, the vehicle data processing unit 145 determines a single aggregated virtual stop or yield line and updates a map accordingly, and the vehicle data processing unit 145 transmits map updates to the vehicle(s) 120. The vehicle(s) 120 can then use the updated map to improve future navigation, driving, and/or maneuvering.

While the present disclosure describes specific operations performed on the vehicle 120 and specific operations performed on the server 130, this is not meant to be limiting. Any operation described herein as being performed by the vehicle 120 can alternatively or in addition be performed by the vehicle data processing unit 145. For example, the vehicle 120 can transmit an indication of a cause of a vehicle 120 stop to the vehicle data processing unit 145, and the vehicle data processing unit 145 can determine whether the cause corresponds to an unmarked intersection and/or a location at which yields occur and, if so, generate a virtual stop or yield line. Similarly, any operation described herein as being performed by the vehicle data processing unit 145 can alternatively or in addition be performed by the vehicle 120. For example, the vehicle 120 can receive virtual stop or yield line data from other vehicles 120 and cluster the virtual stop or yield lines to form a representative virtual stop or yield line.

In a further embodiment, the techniques described herein as being implemented by the vehicle 120 and/or the vehicle data processing unit 145 can be used to identify other unobservable road network features (e.g., unobservable road network features other than unmarked intersections or positions at which vehicles 120 wait to merge with incoming traffic) and update map data 154, 165 accordingly. For example, other unobservable road network features can be at speed bumps, gutters crossing a street, unmarked crosswalks, railroad crossings, and/or other features at which vehicles 120 often come to a partial, but not a complete, stop (e.g., where a partial stop may be when a vehicle 120 slows by a threshold velocity and/or by a threshold percentage, and then accelerates thereafter). The vehicle(s) 120 and/or the vehicle data processing unit 145 can generate a representative virtual partial stop line at the location of one of these features using the techniques described herein and update the map data 154, 165 to include the representative virtual partial stop line.

In a further embodiment, the stop cause analyzer 226 can be configured to keep actual stops that are caused by situations other than or in addition to the vehicle 120 being at an unmarked intersection and/or at a position where yielding occurs that optionally may result in the vehicle 120 operating in a sensitive or cautious mode and/or alerting a driver to be more cautious. Such situations can be road obstacles (or road hazards), such as speed bumps, gutters, informal crosswalks, potholes, construction, uneven surfaces, and/or other similar obstacles that are not necessarily at an intersection. For example, the stop cause analyzer 226 can keep actual stops that are caused by the vehicle 120 identifying a pedestrian while the vehicle 120 is not at an intersection. The stop line generator 228 can generate a virtual stop line in a manner as described herein and provide the virtual stop line data to the stop line aggregator 246. The stop line generator 228 may further include information in the virtual stop line data indicating that there may be a hidden problem (e.g., a hidden danger) at the location of the virtual stop line (e.g., pedestrians cross at an unmarked location). The stop line aggregator 246 can then determine a representative virtual stop line, the map updater 248 may update the map data 154 to include the representative virtual stop line and/or information indicating that there may be hidden problem at the location of the representative virtual stop line, and the map updater 248 may transmit the updated map data 154 to the data processing system 123. The vehicle control system 126 may then, based on the updated map data 154, 165, operate in a sensitive or cautious mode when near the location of the representative virtual stop line given that a hidden problem has been identified. For example, the vehicle control system 126 may provide control commands 164 to the operative systems 127 that direct the operative systems 127 to cause the vehicle 120 to drive and/or maneuver at a slower velocity, to turn on headlights, fog lights, and/or blinkers, to sound a horn, to turn on traction control, etc. while within a certain distance of the representative virtual stop line associated with the hidden problem. As another example, the vehicle control system 126 may instruct the interior interface system 125 to display an alert to a driver to travel at a slower speed, to turn on headlights, fog lights, and/or blinkers, to sound a horn, to turn on traction control, etc. while within a certain distance of the representative virtual stop line associated with the hidden problem.

Figure 3:
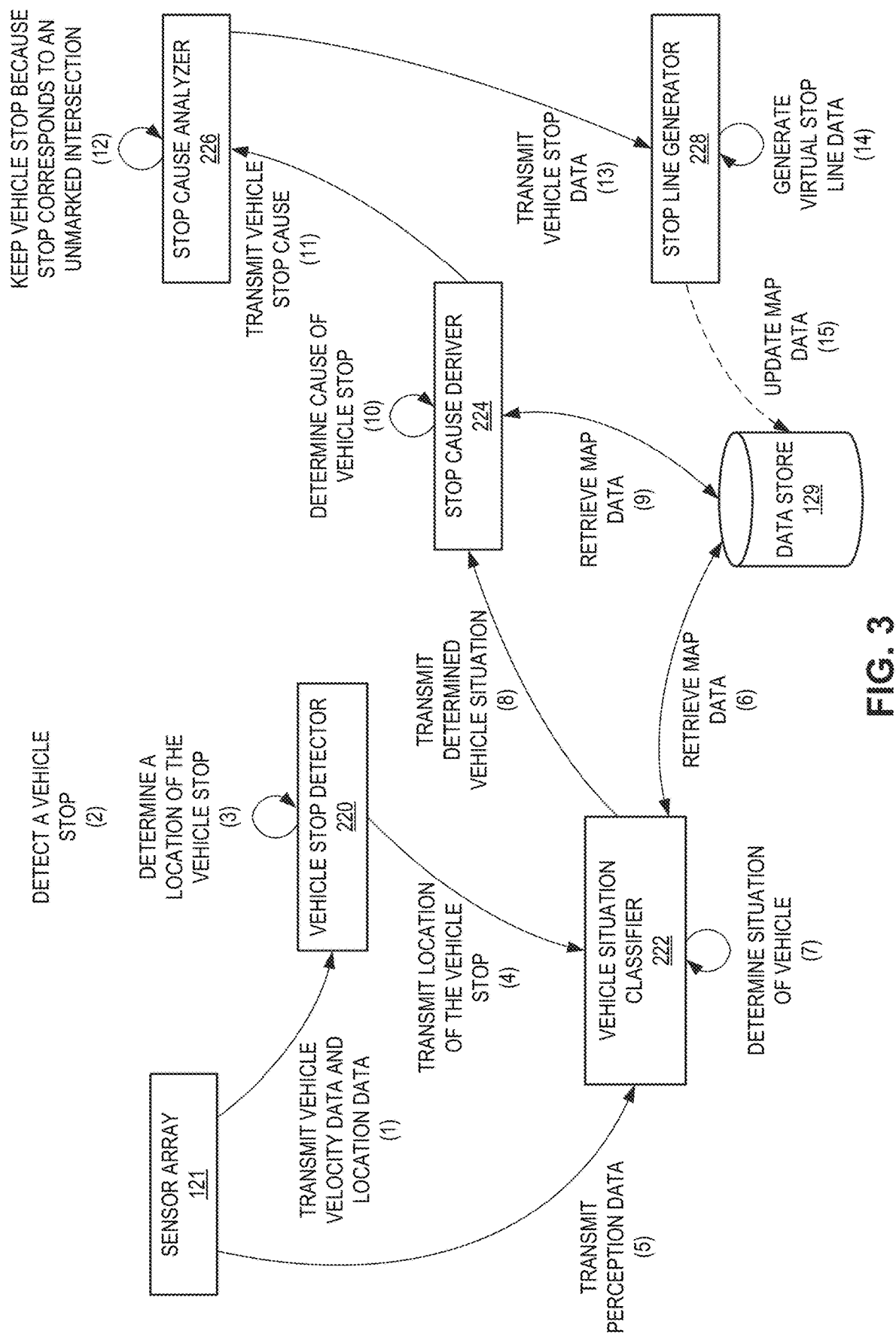
FIG. 3 illustrates a block diagram showing the operations performed by the vehicle to generate a virtual stop line, according to one embodiment.

FIG. 3 illustrates a block diagram showing the operations performed by the vehicle 120 to generate a virtual stop line, according to one embodiment. As illustrated in FIG. 3, the sensor array 121 may transmit vehicle velocity data and location data to the vehicle stop detector 220 at (1). For example, the vehicle velocity data can include vehicle 120 velocity values at various time instants. The location data can include the geographic coordinates of the vehicle 120 and/or the lane in which the vehicle 120 was located at various time instants. The sensor array 121 may continuously or periodically transmit the vehicle velocity data and/or the location data to the vehicle stop detector 220.

The vehicle stop detector 220 can detect a vehicle stop at (2). For example, the vehicle stop detector 220 may determine that the vehicle 120 stopped at a particular time instant based on a velocity profile of the vehicle 120 (as derived from the vehicle velocity data). The vehicle stop detector 220 can then determine a location of the vehicle stop at (3). For example, the vehicle stop detector 220 can use the location data to identify the geographic coordinates and/or lane at which the vehicle 120 was situated at the time instant corresponding to the detected vehicle 120 stop. The vehicle stop detector 220 can then transmit an indication of the location of the vehicle stop to the vehicle situation classifier 222 at (4). As described herein, the location can include geographic coordinates and/or an identification of a lane in which the vehicle 120 was positioned.

Before, during, and/or after the vehicle stop detector 220 detects a vehicle stop and/or determines a location of the vehicle stop, the sensor array 121 can transmit perception data to the vehicle situation classifier 222 at (5). The perception data may be associated with (e.g., captured at) the vehicle 120 stop time instant or a range of time instants around the vehicle 120 stop time instant. The perception data can include data used to derive at least a portion of the horizon, occupancy, semantics, and/or velocity layers. For example, the perception data can include radar data, LiDAR data, camera data, etc. The vehicle situation classifier 222 can also retrieve map data (e.g., map data 165) from the data store 129 (e.g., directly or via the vehicle control system 126) at (6). The vehicle situation classifier 222 can use the map data to derive at least a portion of the horizon layer. Thus, the vehicle situation classifier 222 can use the perception data and/or the map data to form the grid map. The vehicle situation classifier 222 can then provide the grid map as an input to a trained artificial intelligence engine (e.g., a trained deep neural network, a trained machine learning model, etc.) executed by the vehicle situation classifier 222. As a result, the trained artificial intelligence engine may produce an output that allows the vehicle situation classifier 222 to determine a situation of the vehicle 120 at the vehicle 120 stop time instant at (7). The vehicle situation classifier 222 can transmit the determined vehicle situation to the stop cause deriver 224 at (8).

The stop cause deriver 224 can retrieve map data from the data store 129 (e.g., directly or via the vehicle control system 126) at (9). Using the determined vehicle situation and/or the map data, the stop cause deriver 224 can determine a cause of a vehicle stop at (10). For example, the cause can be that a painted stop line was present at an intersection, that another vehicle was in front of the vehicle 120 while not at an intersection, that another vehicle was in front of the vehicle 120 at an intersection, that the vehicle 120 was at an unmarked intersection (e.g., because no other vehicle was in front of the vehicle 120 and no marked stop or yield line was present), that the vehicle 120 was in a position waiting to merge into oncoming traffic (e.g., because no other vehicle was in front of the vehicle 120, no marked stop or yield line was present, and the vehicle 120 was in the process of turning or changing lanes), and/or the like. The stop cause deriver 224 can transmit an indication of the cause of the vehicle 120 stop to the stop cause analyzer 226 at (11).

The stop cause analyzer 226 can filter stops caused by reasons that are not of interest to the data processing system 123. For example, the stop causer analyzer 226 can filter stops that occurred as a result of a leading vehicle while the vehicle 120 was not at an intersection. However, the stop cause analyzer 226 may keep stops that occurred as a result of the vehicle 120 being at an unmarked intersection or being in a position to wait to merge into oncoming traffic. Here, the stop cause analyzer 226 keeps the vehicle stop at (12) because the stop corresponds to an unmarked intersection. As a result, the stop cause analyzer 226 can transmit vehicle stop data to the stop line generator 228 at (13). The vehicle stop data can include a geographic location of the detected stop, a lane in which the vehicle 120 was positioned during the detected stop, and/or a time instant at which the stop occurred.

The stop line generator 228 can generate virtual stop line data at (14). For example, the virtual stop line data can indicate a geographic location and/or lane at which a vehicle 120 should stop. Optionally, the stop line generator can retrieve the map data (e.g., the map data 165) from the data store 129 (e.g., directly or via the vehicle control system 126) and update the map data at (15), storing the updated map data in the data store 129. Thus, the next time the vehicle 120 arrives at the geographic location and/or lane corresponding to the virtual stop line, the vehicle control system 126 can use the updated map data to instruct the interior interface system 125 and/or an external user device 102 to display stop instructions, to instruct the operative systems 127 to stop the vehicle 120, to instruct the operative systems 127 to assist the driver in stopping the vehicle 120, and/or the like.

While FIG. 3 illustrates the operations performed to generate a virtual stop line, this is not meant to be limiting. The operations described with respect to FIG. 3 can also be used to generate a virtual yield line, a virtual line or marking indicating that the vehicle 120 should operate in a more cautious or sensitive mode, and/or the like.

While FIG. 3 depicts a sequence of operations occurring in a numbered order, this is not meant to be limiting. Some or all of the operations described above with respect to FIG. 3 can be performed in a different order than shown. For example, while FIG. 3 depicts the stop cause deriver 224 retrieving the map data after receiving the indication of the determined vehicle situation, the stop cause deriver 224 can retrieve the map data prior to receiving the indication of the determined vehicle situation.

Any of the operations performed by the vehicle 120 as depicted in FIG. 3 can be performed periodically and/or continuously as the vehicle 120 travels along a route. Alternatively or in addition, some or all of the operations can be performed after the vehicle 120 has finished traveling along a route and is an idle and/or parked position.

Figure 4A:
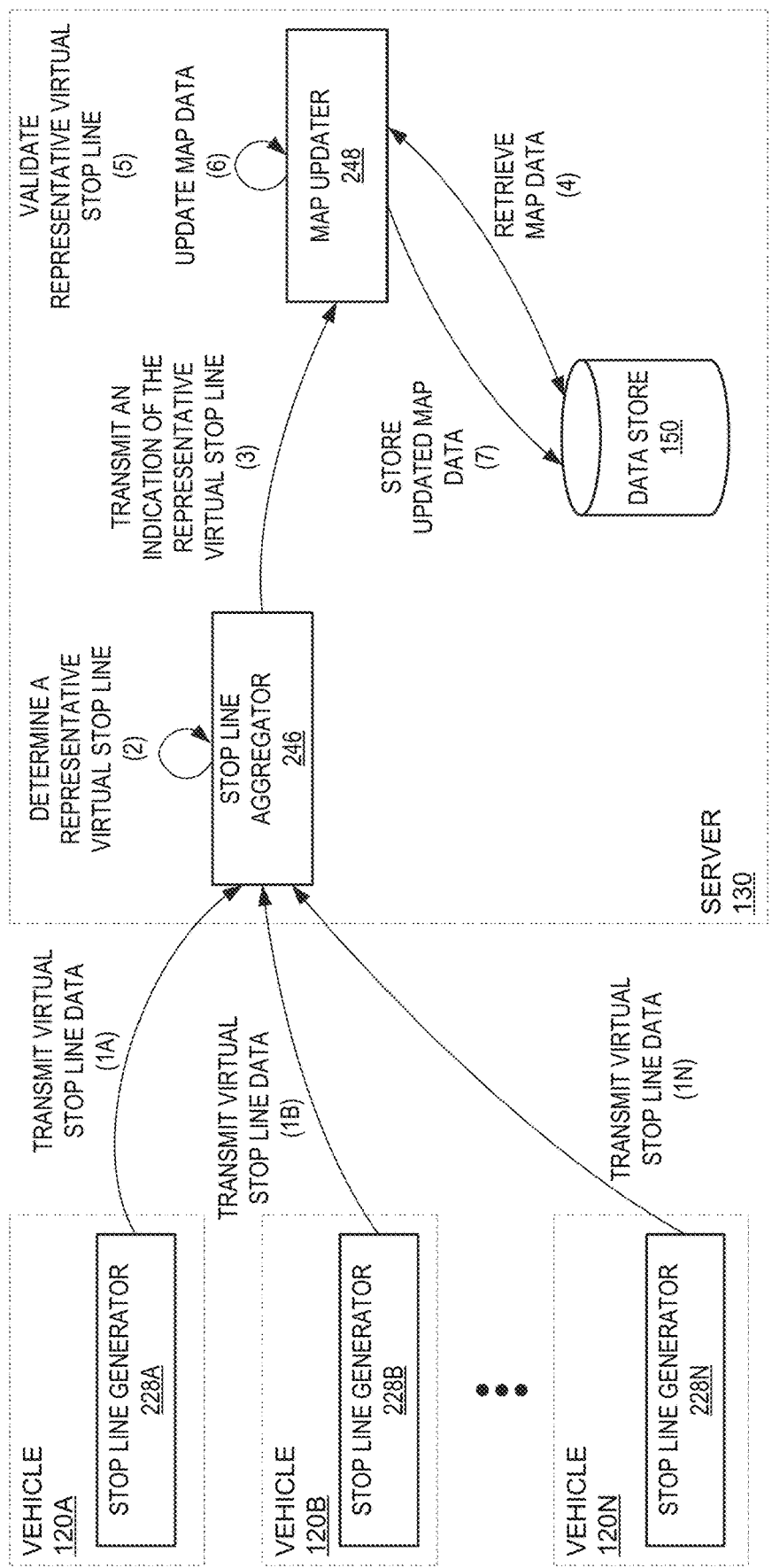
FIG. 4A illustrates a block diagram showing the operations performed by vehicle(s) and the server to update a map to include a representative virtual stop line, according to one embodiment.

FIG. 4A illustrates a block diagram showing the operations performed by vehicle(s) 120 and the server 130 to update a map to include a representative virtual stop line, according to one embodiment. As illustrated in FIG. 4A, various vehicles 120A-N can transmit virtual stop line data to the stop line aggregator 246. In particular, a stop line generator 228A of the vehicle 120A can transmit virtual stop line data to the stop line aggregator 246 at (1A), a stop line generator 228B of the vehicle 120B can transmit virtual stop line data to the stop line aggregator 246 at (1B), a stop line generator 228N of the vehicle 120N can transmit virtual stop line data to the stop line aggregator 246 at (1N), and so on. The vehicles 120A-N can transmit the virtual stop line data at the same and/or different times.

For the purposes of FIG. 4A, the virtual stop line data transmitted by the vehicles 120A-N may correspond to the same intersection. However, the virtual stop line data may not necessarily all correspond to the same geographic location and/or lane. For example, the vehicle 120A may have stopped a short distance before the vehicle 120B at the intersection (e.g., 2 m before the vehicle 120B), and therefore the virtual stop line data transmitted by the vehicle 120A may correspond to a geographic location that is a short distance away from the geographic location corresponding to the virtual stop line data transmitted by the vehicle 120B. Thus, the stop line aggregator 246 may receive virtual stop line data corresponding to geographic locations and/or lanes within a short distance of each other. As mentioned above, a vehicle 120A-N can transmit virtual stop line data multiple times, such as one or more times the vehicle 120A-N travels to and/or through the intersection. The vehicle 120A-N may not stop in the same location each time, however. Thus, even the same vehicle 120A-N can transmit to the stop line aggregator 246 virtual stop line data corresponding to different geographic locations and/or lanes at the same intersection.

The stop line aggregator 246 can determine a representative virtual stop line at (2) using the virtual stop line data received from the vehicles 120A-N. For example, the stop line aggregator 246 can cluster the different geographic locations and/or lanes identified in the virtual stop line data to identify a representative geographic location and/or lane (e.g., an average geographic location and/or lane, a median geographic location and/or lane, a mode geographic location and/or lane, and/or a geographic location and/or lane identified using any other statistical analysis). The stop line aggregator 246 can transmit an indication of the representative virtual stop line to the map updater 248 at (3).

The map updater 248 can retrieve map data from the data store 150 at (4). For example, the map data can be the map data 154. The map updater 248 can use the map data to perform a validation of the representative virtual stop line. For example, the map updater 248 can determine whether the representative virtual stop line is near a painted or marked stop line and/or another virtual stop line incorporated into the map data. If the representative virtual stop line is near a painted or marked stop line and/or another virtual stop line, it may be redundant of the stop line that already exists. Thus, the map updater 248 may not validate the representative virtual stop line and take no further action. However, if the representative virtual stop line is not near a painted or marked stop line and/or another virtual stop line, then no redundancy may exist and the representative virtual stop line can be validated. Here, the map updater 248 validates the representative virtual stop line at (5). Thus, the map updater 248 updates the map data at (6) to include the data corresponding to the representative virtual stop line. For example, the data can include a geographic location or range of geographic locations (e.g., a line of geographic locations) and/or a lane at which a stop should occur. Incorporating the representative virtual stop line data into the map data may cause a graphically displayed map corresponding to the map data to depict a color or shaded line at the geographic location, range of geographic locations, and/or identified lane. Similarly, incorporating the representative virtual stop line data into the map data may cause the map data to include a line at the geographic location, range of geographic locations, and/or identified lane that appears identical or nearly identical to a painted or marked stop line. Thus, the map updater 248 can update the map data to include a virtual stop line that otherwise appears to be an actual stop line existing in the environment. The map updater 248 can optionally store the updated map data in the data store 150 at (7).

Figure 4B:
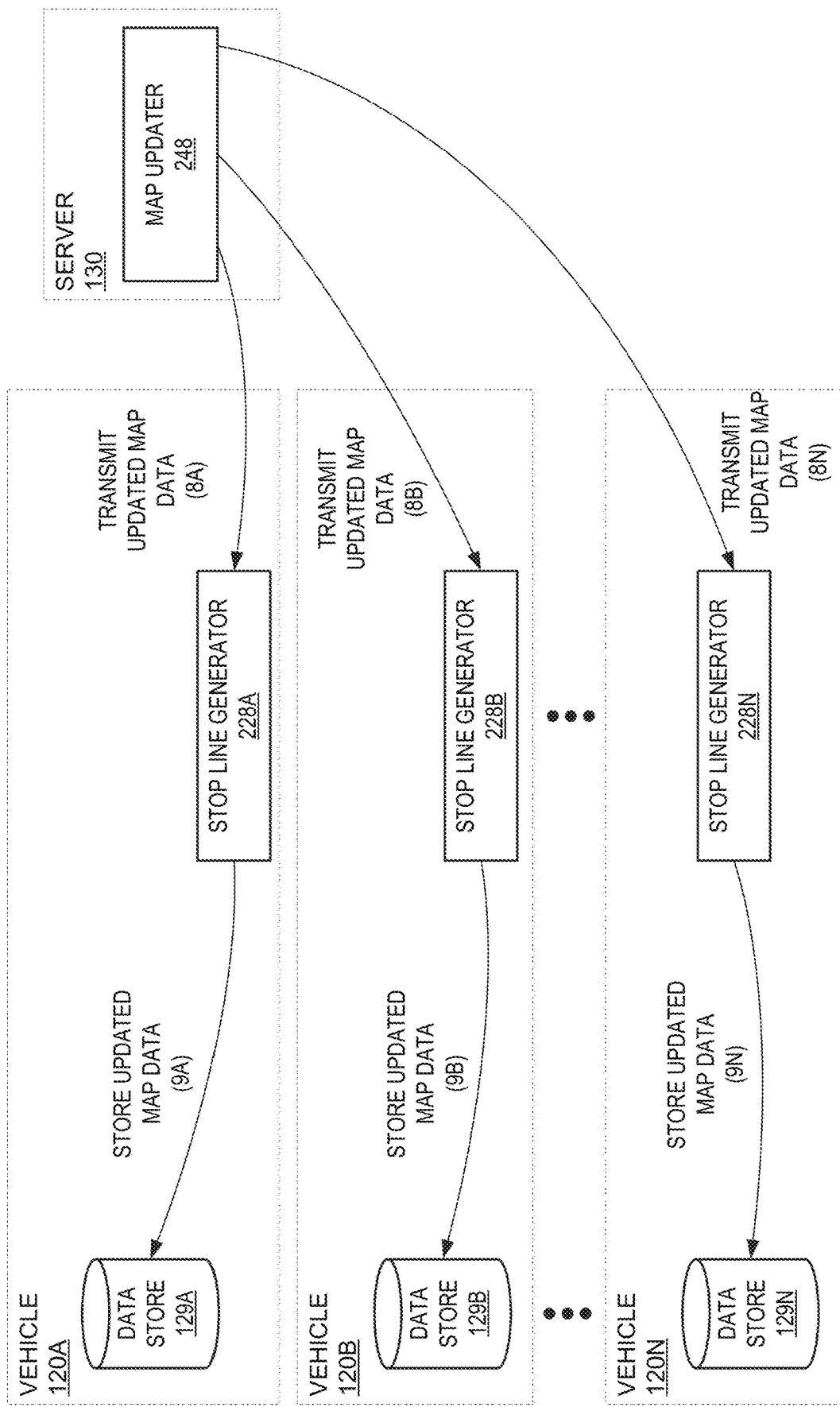
FIG. 4B illustrates a block diagram showing the operations performed by the vehicle(s) and the server to provide vehicle(s) with updated maps, according to one embodiment.

FIG. 4B illustrates a block diagram showing the operations performed by the vehicle(s) 120 and the server 130 to provide vehicle(s) 120 with updated maps, according to one embodiment. As described above, the vehicle(s) 120 and/or the server 130 can implement a self-healing map process in which vehicle(s) 120 and the server 130 can communicate with each other to continually refine and/or update maps to improve future navigation, driving, and/or maneuvering. FIG. 4B depicts the operations performed to provide vehicles 120A-N with updated maps based on virtual stop line data provided by one or more of the vehicles 120A-N.

As illustrated in FIG. 4B, the map updater 248 has already validated a representative virtual stop line and updated the map data. The map updater 248 can then transmit the updated map data to the vehicles 120A-N. In particular, the map updater 248 can transmit the updated map data to the stop line generator 228A of the vehicle 120A at (8A), the map updater 248 can transmit the updated map data to the stop line generator 228B of the vehicle 120B at (8B), the map updater 248 can transmit the updated map data to the stop line generator 228N of the vehicle 120N at (8N), and so on. The map updater 248 can transmit the updated map data to the vehicles 120A-N simultaneously, in sequence, and/or any combination thereof. The map updater 248 can distribute the updated map data to any number of vehicles 120A-N, whether or not such vehicles 120A-N provided the virtual stop line data used to identify the representative virtual stop line.

The stop line generators 228A-228N can then store the updated map data in their respective data stores 129A-N. In particular, the stop line generator 228A can store the updated map data in the data store 129A (e.g., directly or via a vehicle control system 126A) at (9A), the stop line generator 228B can store the updated map data in the data store 129B (e.g., directly or via a vehicle control system 126B) at (9B), the stop line generator 228N can store the updated map data in the data store 129N (e.g., directly or via a vehicle control system 126N) at (9N), and so on. The stop line generators 228A-N can store the updated map data at the same and/or different times. As described herein, a vehicle 120A-N can then use the updated map data to, for example, instruct a driver to stop, assist a driver in stopping, automatically stop, and/or enter a cautious or sensitive mode when approaching the geographic location and/or lane corresponding to the representative virtual stop line.

While FIGS. 4A-4B illustrate the operations performed to update and distribute map data that includes a representative virtual stop line, this is not meant to be limiting. The operations described with respect to FIGS. 4A-4B can also be used to update and distribute map data that includes a representative virtual yield line, a representative virtual line or marking indicating that the vehicle 120 should operate in a more cautious or sensitive mode, and/or the like.

While FIGS. 4A-4B depict a sequence of operations occurring in a numbered order, this is not meant to be limiting. Some or all of the operations described above with respect to FIGS. 4A-4B can be performed in a different order than shown. For example, while FIG. 4A depicts the map updater 248 validating the representative virtual stop line before updating the map data, the map updater 248 can validate the representative virtual stop line after updating the map data.

Figure 5A:
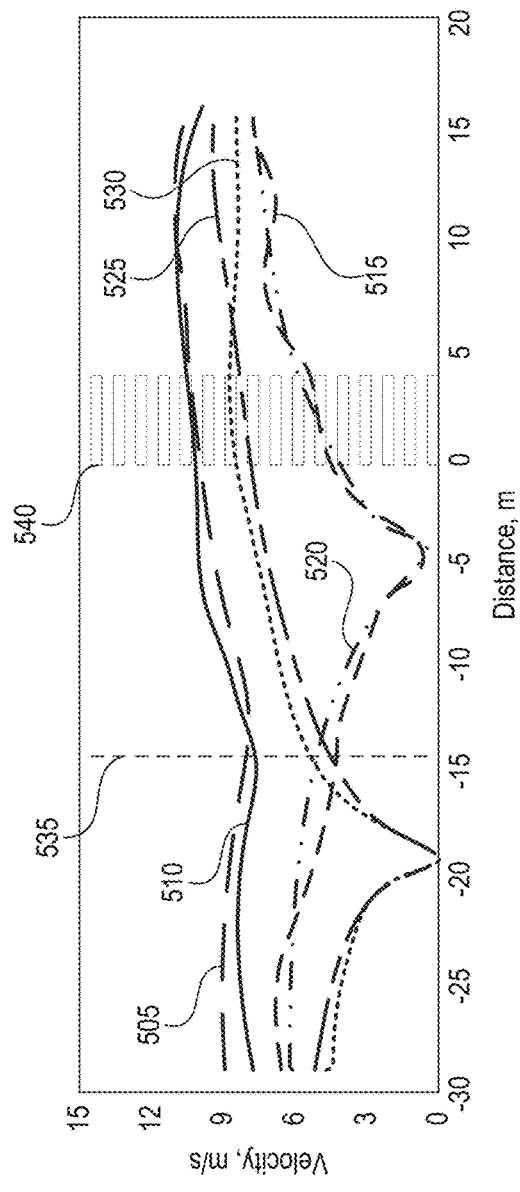
FIGS. 5A-5B illustrate various velocity graphs that visually explain how the vehicle stop detector of FIG. 2 detects an actual stop.
Figure 5B:
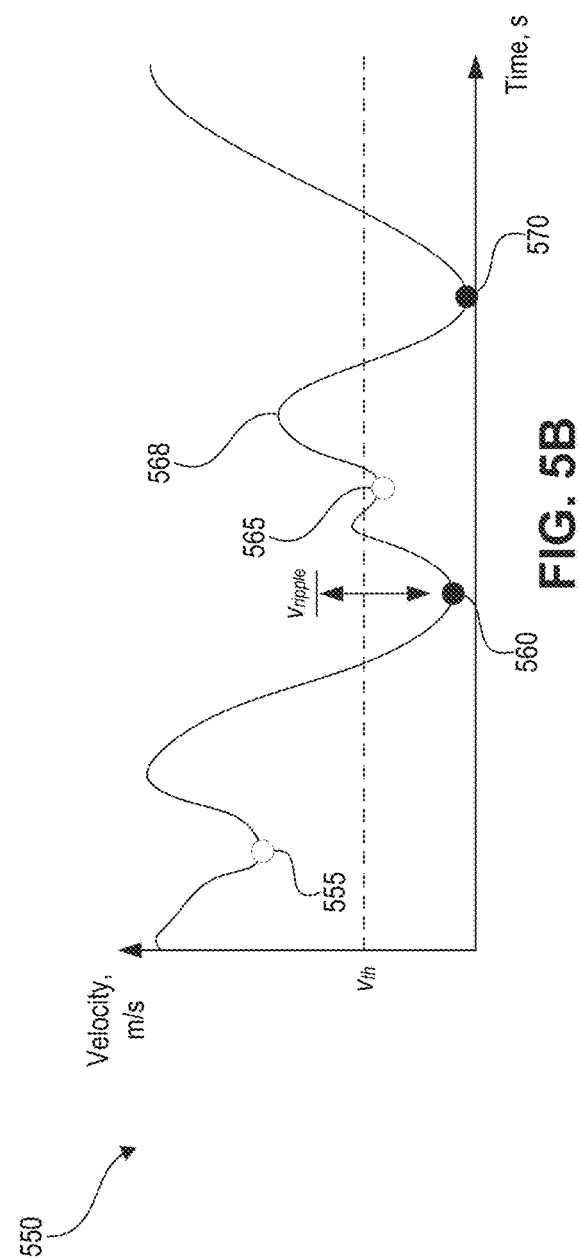

FIGS. 5A-5B illustrate various velocity graphs 500 and 550 that visually explain how the vehicle stop detector 220 detects an actual stop. As illustrated in FIG. 5A, the graph 500 may be an ego vehicle velocity profile that depicts velocity on the y-axis and distance on the x-axis. The graph 500 may correspond to an intersection that includes a crosswalk 540, and the distance values may represent a distance from the crosswalk 540. As depicted in the graph 500, vehicles 120 that traveled according to paths 505 and 510 slowed briefly, but generally maintained speed while passing through the intersection. Such vehicles 120 may not have stopped because of a green light allowing traffic to pass in the direction that the vehicles 120 were traveling (e.g., left to right in the graph 500) and/or no pedestrians were present in the crosswalk 540.

Vehicles 120 that traveled according to paths 515, 520, 525, and 530 stopped at the intersection, however. The stops are evident by the troughs present near the distance of −20 m and near the distance of −5 m. No stop line may be marked or painted on the road even though the crosswalk 540 is present, and therefore an unobservable feature of the road network may be an invisible stop line 535 (which represents the average stop position based on the paths 515, 520, 525, and/or 530). The line 535 may eventually become the representative virtual stop line if one or more vehicles 120 ultimately determine that actual stops occurred at this unmarked intersection. In particular, the vehicle stop detector 220 can analyze these stops to determine whether such stops are actual stops. Factors considered in making the determination may include the rate of deceleration prior to the potential stop, the rate of acceleration after the potential stop, the amount or percentage by which the velocity decreased prior to the potential stop, the amount or percentage by which the velocity increased after the potential stop, the distance that the stop occurred from the crosswalk 540, and/or the like.

As illustrated in FIG. 5B, the graph 550 depicts velocity on the y-axis and time on the x-axis. As depicted in the graph 550, four troughs 555, 560, 565, and 570 in velocity occur at various times and each may correspond to a potential stop. The first trough 555 may be at a velocity that is greater than a velocity threshold value (e.g., WI), and therefore the vehicle stop detector 220 may determine that the potential stop corresponding to the trough 555 is not an actual stop.

The second trough 560 may be at a velocity that is less than the velocity threshold value. Thus, the vehicle stop detector 220 may determine whether any actual stop occurred within a threshold time of the time instant corresponding to the trough 560. Here, the trough 555 may be within the threshold time of the trough 560, but the trough 555 is not an actual stop and therefore the vehicle stop detector 220 determines that there is no actual stop within the threshold time of the time instant corresponding to the trough 560. Accordingly, the vehicle stop detector 220 identifies the trough 560 as corresponding to an actual stop. If an actual stop was present within the threshold time of the time instant corresponding to the trough 560, the vehicle stop detector 220 would then determine whether the velocity had risen by at least the velocity ripple value (e.g., $V_{ripple}$) before the trough 560 occurred. If the velocity had increased by at least the velocity ripple value, then the vehicle stop detector 220 would consider the trough 560 to be a separate, actual stop. Otherwise, if the velocity had not increased by at least the velocity ripple value, then the vehicle stop detector 220 would consider the trough 560 to be a part of the same, actual stop as the previous actual stop.

The third trough 565 may also be at a velocity that is less than the velocity threshold value. However, the vehicle stop detector 220 may determine that the trough 565 does not correspond to an actual stop. While the velocity at the trough 565 is less than the velocity threshold value, an actual stop occurred within the threshold time of the time instant corresponding to the trough 565 (e.g., the actual stop corresponding to the 560) and the velocity did not increase by at least the velocity ripple value before falling to the value at the trough 565.

The fourth trough 570 may also be at a velocity that is less than the velocity threshold value. Here, the vehicle stop detector 220 may determine that the trough 570 corresponds to an actual stop. The time instant corresponding to the trough 570 may not be within the threshold time of the time instant corresponding to the trough 560, which is the last detected actual stop. Even if the time instant corresponding to the trough 570 is within the threshold time of the time instant corresponding to the trough 560, the velocity increased by more than the velocity ripple value between the trough 560 time instant and the trough 570 time instant. For example, the difference between the velocity value at peak 568 and the velocity value at the trough 560 may be greater than the velocity ripple value.

Figure 6A:
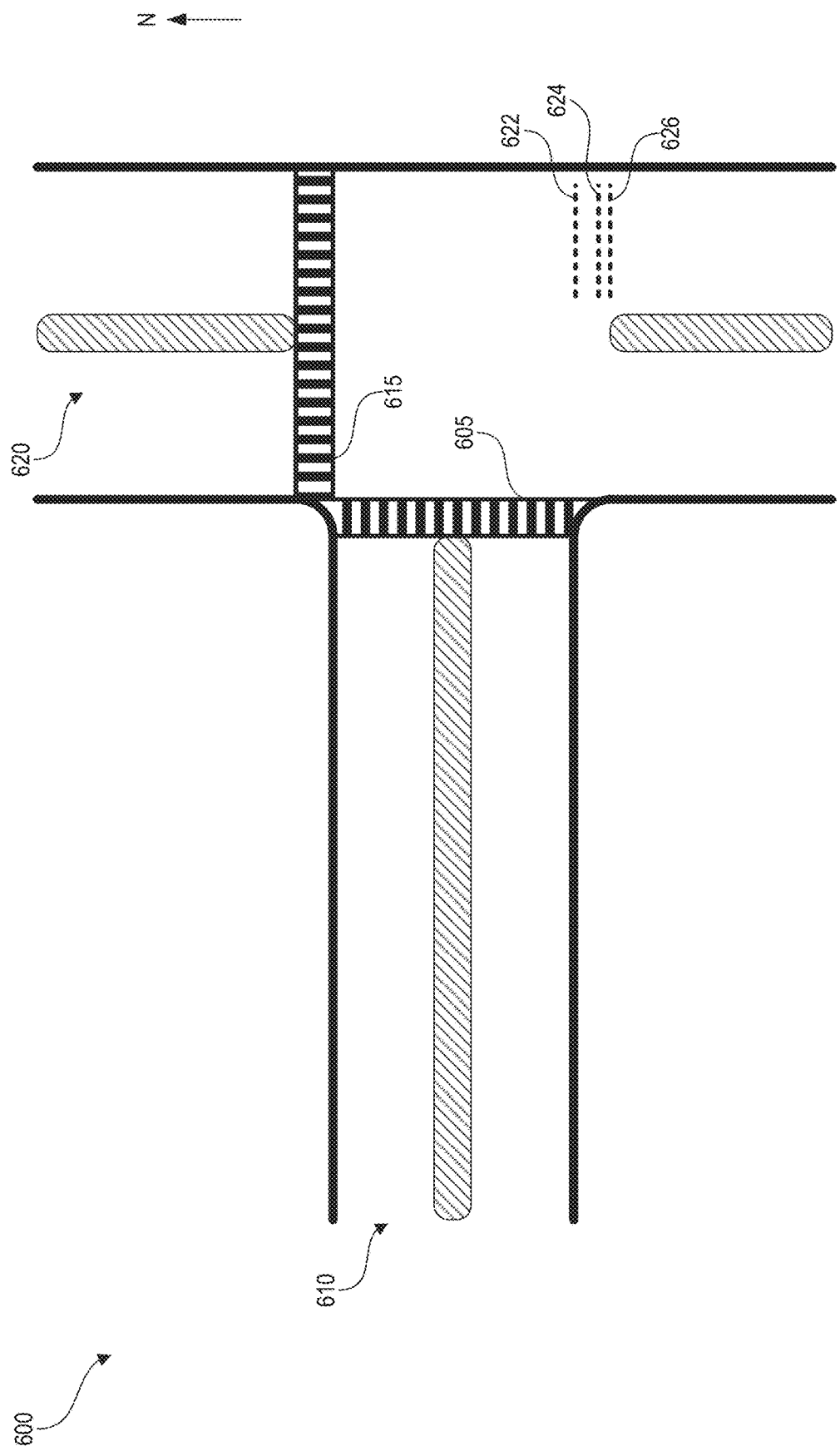
FIG. 6A illustrates an example unmarked intersection at which actual stops may be detected and virtual stop lines may be generated, according to one embodiment.

FIG. 6A illustrates an example unmarked intersection 600 at which actual stops may be detected and virtual stop lines may be generated, according to one embodiment. As illustrated in FIG. 6A, the intersection 600 includes a crosswalk 605 that traverses road 610 and a crosswalk 615 that traverses a North end of road 620. The crosswalks 605 and 615 may serve as natural stop lines and may be recognized as such. No crosswalk traverses the South end of road 620, however, and no other painted or marked stop lines are present. Vehicles 120 may nonetheless stop at the South end of the intersection 600 when traveling North on the road 620 before proceeding through the intersection 600.

Thus, various vehicles 120 may detect actual stops when traveling through the intersection 600, and may generate virtual stop line data corresponding to one or more of the virtual stop lines 622, 624, and/or 626 depicted in FIG. 6A. The vehicle data processing unit 145 may eventually receive this virtual stop line data from one or more vehicles 120 and select or determine a representative virtual stop line. For example, the vehicle data processing unit 145 can select one of virtual stop lines 622, 624, and/or 626 to be the representative virtual stop line. As another example, the vehicle data processing unit 145 can perform a statistical analysis on the virtual stop lines 622, 624, and/or 626 and generate a representative virtual stop line that is an aggregation of the virtual stop lines 622, 624, and/or 626. The vehicle data processing unit 145 can then update map data to include the representative virtual stop line (such that if displayed, a map based on the map data would depict a line similar to the depicted virtual stop lines 622, 624, and/or 626) and transmit the updated map data to one or more vehicles 120.

Figure 6B:
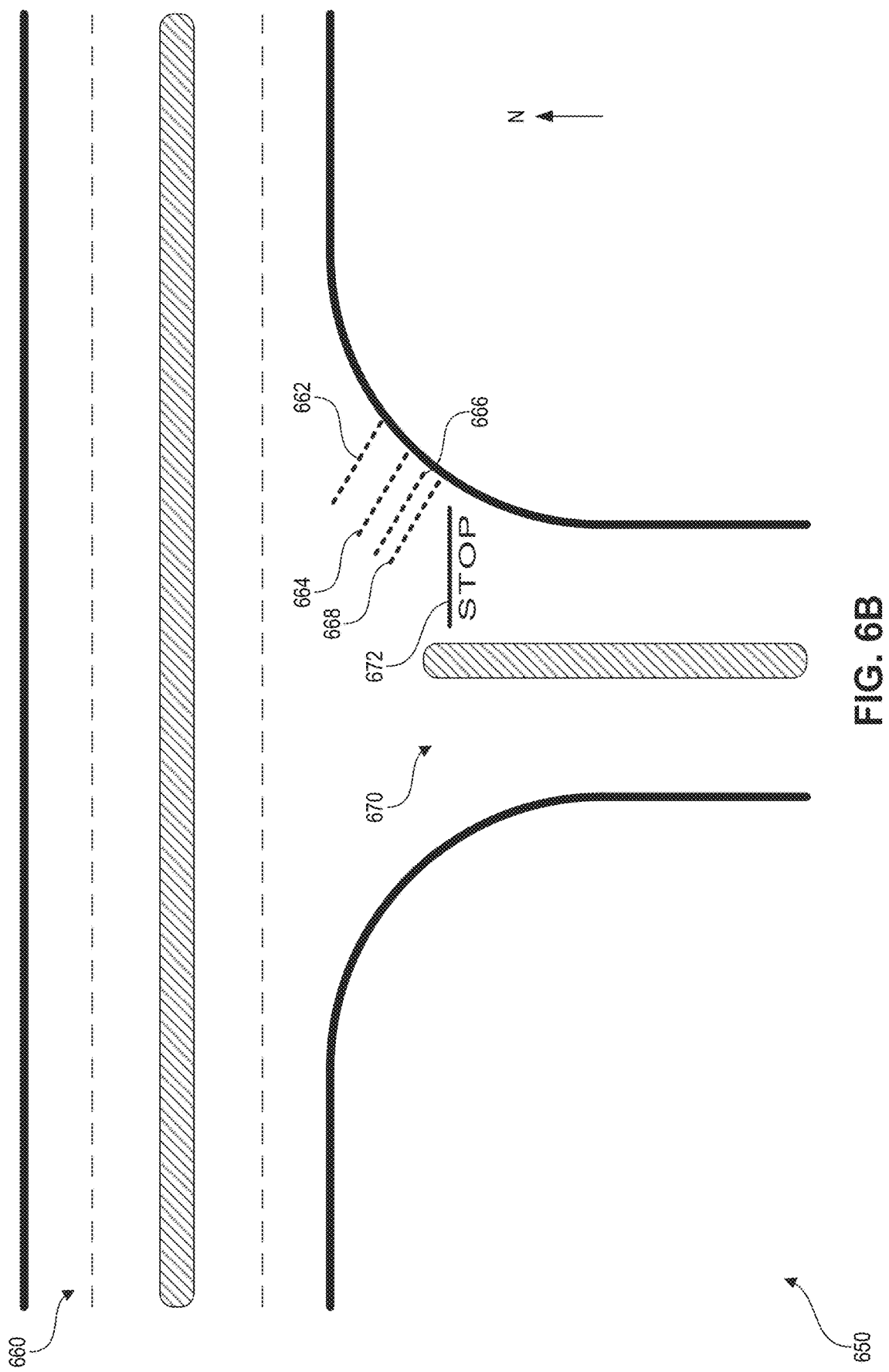
FIG. 6B illustrates an example unmarked, yield intersection at which actual stops may be detected and virtual yield lines may be generated, according to one embodiment.

FIG. 6B illustrates an example unmarked, yield intersection 650 at which actual stops may be detected and virtual yield lines may be generated, according to one embodiment. As illustrated in FIG. 6B, the intersection 650 includes a road 670 intersecting with a road 660. The road 670 may include a marked and/or painted stop line 672. However, a driver operating a vehicle 120 that stops at the stop line 672 may have an obstructed view of traffic traveling East on the road 660. Thus, drivers may not immediately turn right after stopping at the stop line 672. Rather, drivers may cross the stop line 672 and stop again prior to entering the intersection 650 to obtain a better view of the traffic traveling East on the road 660. After stopping the second time, drivers may then merge onto the road 660 when safe.

Thus, various vehicles 120 may detect actual stops when traveling through the intersection 600, and may generate virtual yield line data corresponding to one or more of the virtual yield lines 662, 664, 666, and/or 668 depicted in FIG. 6B. The vehicle data processing unit 145 may eventually receive this virtual yield line data from one or more vehicles 120 and select or determine a representative virtual yield line. For example, the vehicle data processing unit 145 can select one of virtual yield lines 662, 664, 666, and/or 668 to be the representative virtual yield line. As another example, the vehicle data processing unit 145 can perform a statistical analysis on the virtual yield lines 662, 664, 666, and/or 668 and generate a representative virtual yield line that is an aggregation of the virtual yield lines 662, 664, 666, and/or 668. The vehicle data processing unit 145 can then update map data to include the representative virtual yield line (such that if displayed, a map based on the map data would depict a line similar to the depicted virtual yield lines 662, 664, 666, and/or 668) and transmit the updated map data to one or more vehicles 120.

Figure 7:
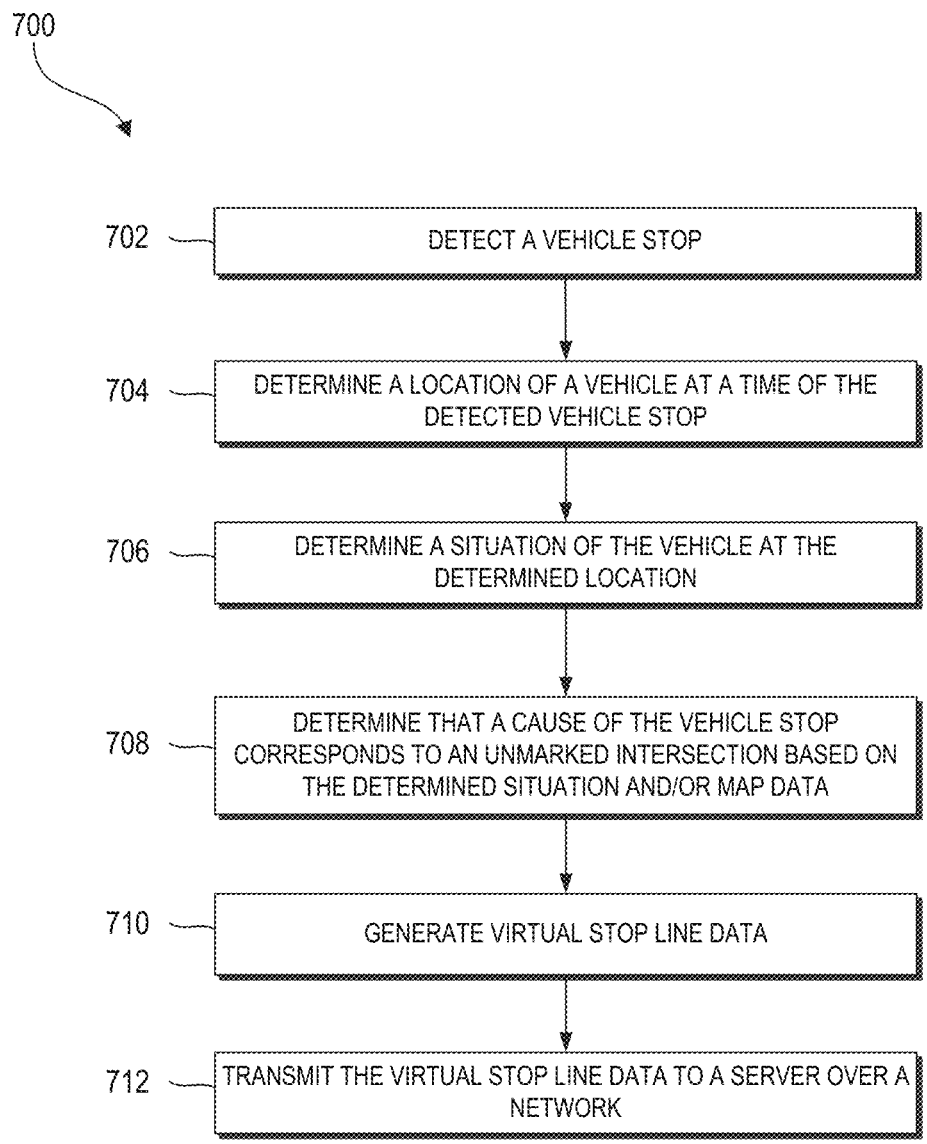
FIG. 7 shows a flow diagram illustrative of embodiments of a routine implemented by the vehicle to generate a virtual stop line.

FIG. 7 shows a flow diagram illustrative of embodiments of a routine 700 implemented by the vehicle 120 to generate a virtual stop line. The elements outlined for routine 700 may be implemented by one or more components that are associated with the data processing system 123 of the vehicle 120.

At block 702, a vehicle stop is detected. For example, the data processing system 123 of the vehicle 120 may detect a stop based on an analysis of the vehicle 120 velocity at various time instants and/or in relation to certain road markings (e.g., stop lines, crosswalks, etc.). A process performed by the data processing system 123 to detect a vehicle stop is described in greater detail below with respect to FIG. 10.

At block 704, a location of a vehicle at a time of the detected vehicle stop is determined. For example, the location may be determined using GPS data that identifies the location of the vehicle 120 at a time instant corresponding to the detected stop.

At block 706, a situation of the vehicle at the determined location is determined. For example, the situation may be determined by obtaining perception data and/or map data, converting the perception data and/or map data into a grid map, and applying the grid map as an input to a trained deep neural network.

At block 708, it is determined that a cause of the vehicle stop corresponds to an unmarked intersection. The determination may be made based on the determined vehicle situation and/or map data.

At block 710, virtual stop line data is generated. The virtual stop line data may be generated because the determined vehicle stop cause is a reason that is of interest to the vehicle 120 and/or the server 130 in eventually generating a virtual stop line.

At block 712, the virtual stop line data is transmitted to a server over a network. For example, the virtual stop line data can be transmitted to the vehicle data processing unit 145 of the server 130. After the virtual stop line data is transmitted, the routine 700 is complete.

While FIG. 7 is described with respect to virtual stop lines, this is not meant to be limiting. A routine similar to the routine 700 can be executed to generate virtual yield line data. For example, virtual yield line data may be generated if the determined vehicle stop cause is related to the vehicle 120 yielding while waiting to merge into oncoming traffic.

Figure 8:
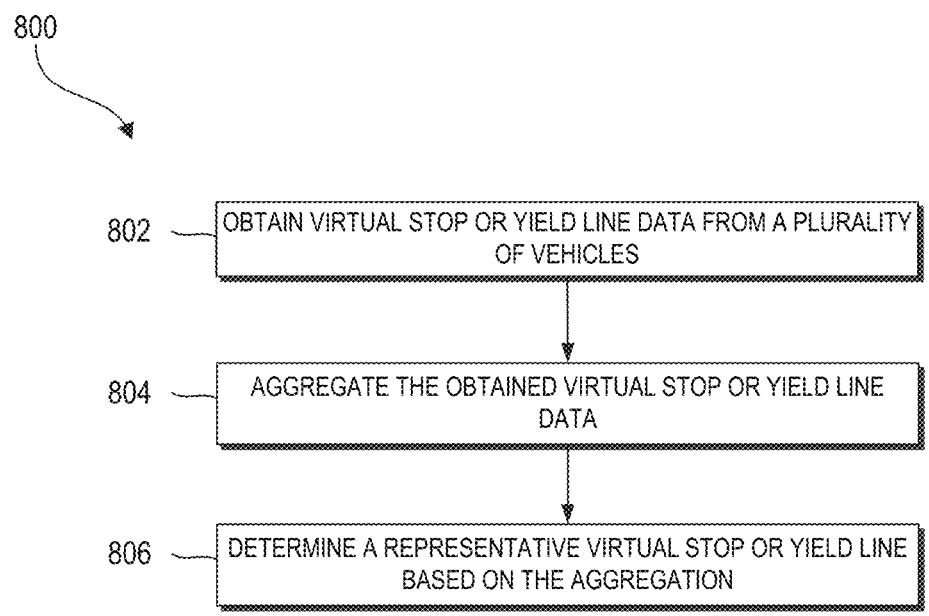
FIG. 8 shows a flow diagram illustrative of embodiments of a routine implemented by the server to identify a representative virtual stop line.

FIG. 8 shows a flow diagram illustrative of embodiments of a routine 800 implemented by the server 130 to identify a representative virtual stop line. The elements outlined for routine 800 may be implemented by one or more components that are associated with the vehicle data processing unit 145 of the server 130.

At block 802, virtual stop or yield line data is obtained from a plurality of vehicles. For example, one or more vehicles 120 may execute the routine 700 of FIG. 7 to generate virtual stop or yield line data for a particular intersection or yielding area.

At block 804, the obtained virtual stop or yield line data is aggregated. For example, the obtained virtual stop or yield line data can be clustered to identify an average virtual stop or yield line, a median virtual stop or yield line, the most common virtual stop or yield line, etc.

At block 806, a representative virtual stop or yield line is determined based on the aggregation. For example, the representative virtual stop or yield line may be a virtual stop or yield line generated by a particular vehicle 120 or may be a combination of virtual stop or yield lines generated by the same vehicle 120 or multiple vehicles 120. After the representative virtual stop or yield line is determined, the routine 800 is complete.

Figure 9:
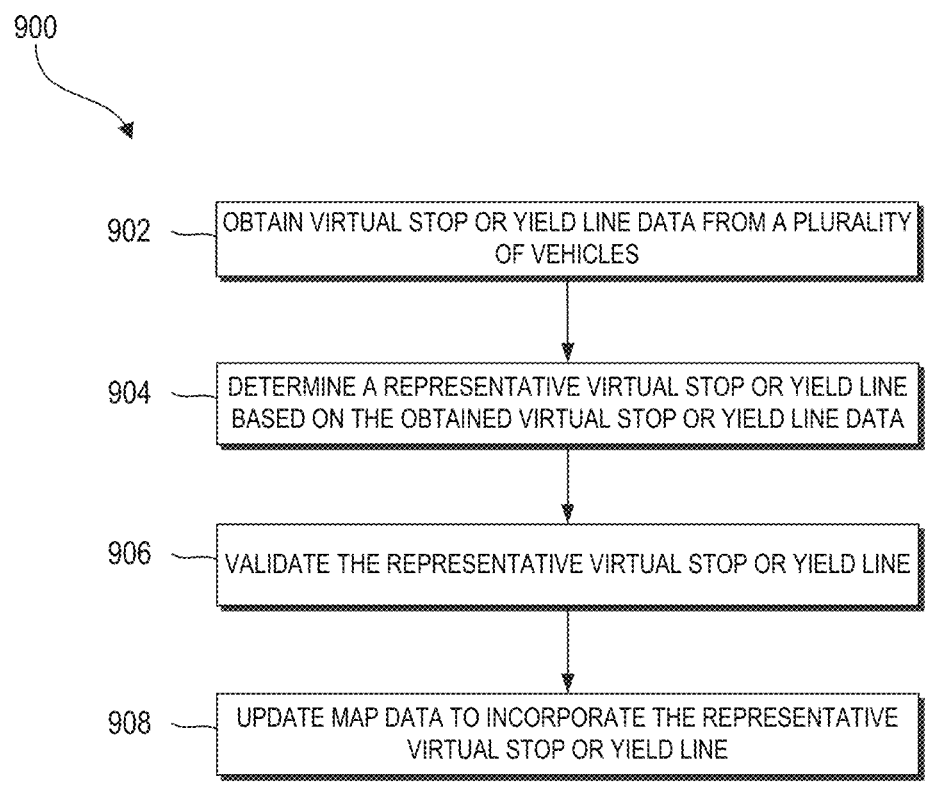
FIG. 9 shows a flow diagram illustrative of embodiments of a routine implemented by the server to update or edit a map based on vehicle-provided data.

FIG. 9 shows a flow diagram illustrative of embodiments of a routine 900 implemented by the server 130 to update or edit a map based on vehicle-provided data. The elements outlined for routine 900 may be implemented by one or more components that are associated with the vehicle data processing unit 145 of the server 130.

At block 902, virtual stop or yield line data is obtained from a plurality of vehicles. For example, one or more vehicles 120 may execute the routine 700 of FIG. 7 to generate virtual stop or yield line data for a particular intersection or yielding area.

At block 904, a representative virtual stop or yield line is determined based on the obtained virtual stop or yield line data. For example, the representative virtual stop or yield line may be a virtual stop or yield line generated by a particular vehicle 120 or may be a combination of virtual stop or yield lines generated by the same vehicle 120 or multiple vehicles 120.

At block 906, the representative virtual stop or yield line is validated. For example, the representative virtual stop or yield line may be compared to any actual or virtual stop lines already incorporated in the map data. If the representative virtual stop or yield line is close to an already-existing stop line, then the validation may fail. Otherwise, if the representative virtual stop or yield line is not close to an already-existing stop line, then the validation may succeed.

At block 908, the validation succeeded and the map data is updated or edited to incorporate the representative virtual stop or yield line. The updated map data can then be transmitted to one or more vehicles 120 to aid in future navigation, driving, and/or maneuvering. After the map data is updated, the routine 900 is complete.

Figure 10:
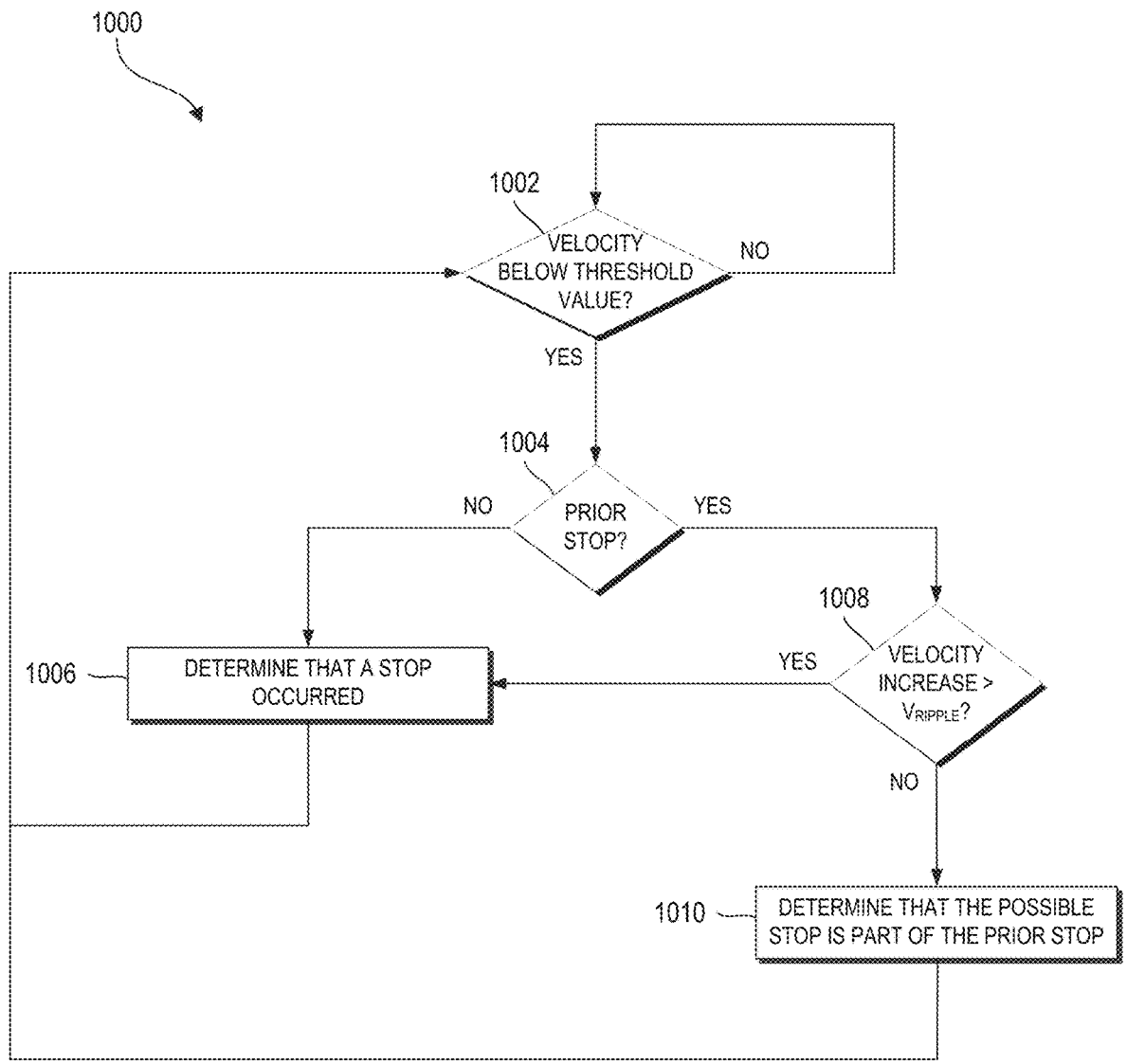
FIG. 10 shows a flow diagram illustrative of embodiments of a routine implemented by the vehicle to detect a stop.

FIG. 10 shows a flow diagram illustrative of embodiments of a routine 1000 implemented by the vehicle 120 to detect a stop. The elements outlined for routine 1000 may be implemented by one or more components that are associated with the data processing system 123 of the vehicle 120.

At block 1002, a determination is made as to whether a velocity at a time instant corresponding to a velocity trough or valley is below a velocity threshold value. If the velocity at the time instant is not below the velocity threshold value, then no stop is detected and the routine 1000 reverts back to block 1002. Otherwise, if the velocity at the time instant is below the velocity threshold value, a possible stop is detected and the routine 1000 proceeds to block 1004.

At block 1004, a determination is made as to whether a prior stop occurred within a threshold time of the time instant of the possible stop currently being evaluated. If a prior stop occurred within the threshold time, the routine 1000 proceeds to block 1008. Otherwise, if a prior stop did not occur within the threshold time, the routine 1000 proceeds to block 1006.

At block 1006, it is determined that a stop occurred. The routine 1000 then reverts back to block 1002 to repeat the routine 1000 to detect a future stop.

At block 1008, a determination is made as to whether the velocity increased by at least the velocity ripple value between a time instant corresponding to the prior stop and the time instant of the possible stop currently being evaluated. If the velocity increased by at least the velocity ripple value, then the possible stop currently being evaluated is a stop and the routine 1000 proceeds to block 1006. Otherwise, if the velocity did not increase by at least the velocity ripple value, then the possible stop currently being evaluated is actually a part of the prior stop (e.g., the vehicle 120 slowed down to a stop, the brake was temporarily released allowing the vehicle 120 to move forward, and then the brake was engaged once again) and the routine 1000 proceeds to block 1010.

At block 1010, it is determined that the possible stop currently being evaluated is part of the prior stop. The routine 1000 then reverts back to block 1002 to repeat the routine 1000 to detect a future stop.

Figure 11:
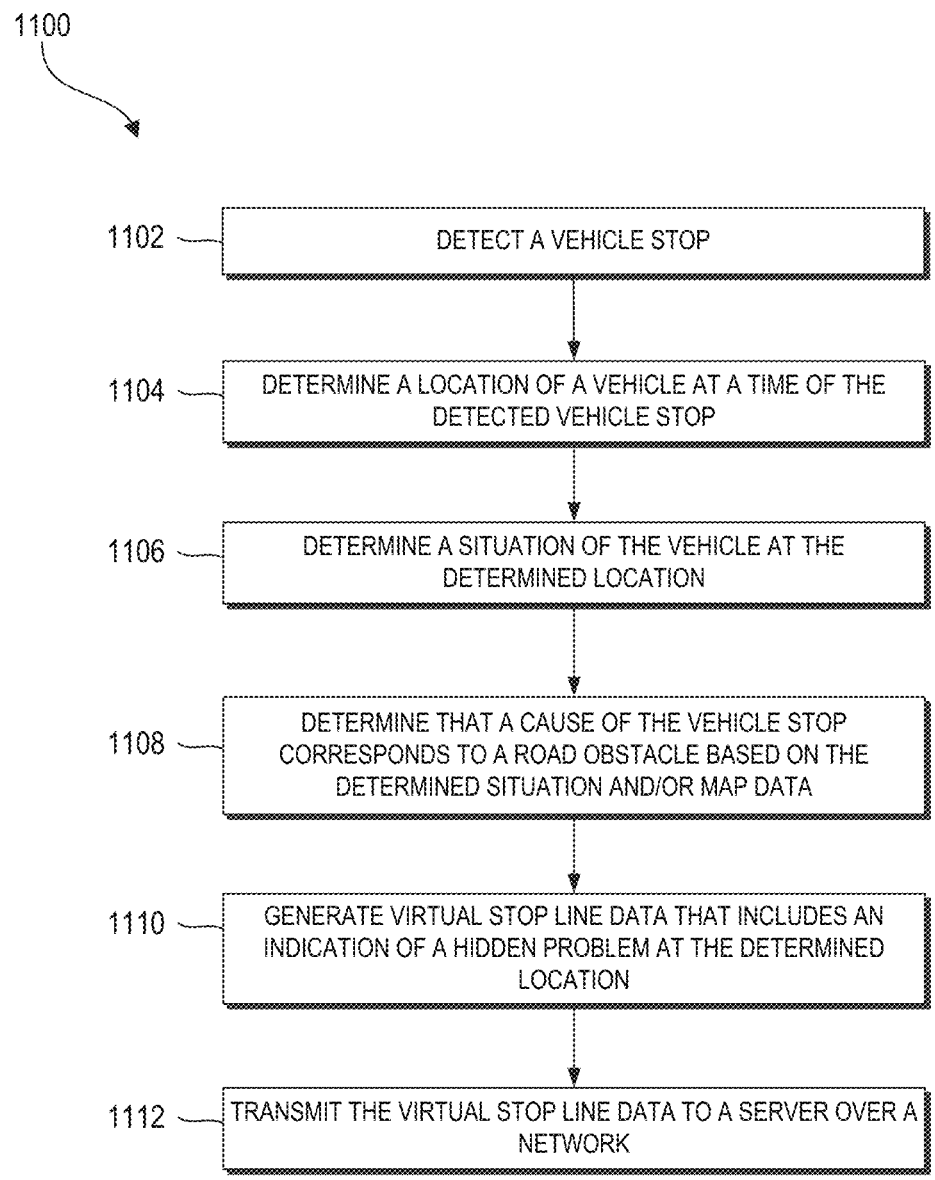
FIG. 11 shows a flow diagram illustrative of embodiments of a routine implemented by the vehicle to generate virtual stop line data that includes an indication of a hidden problem at the location of the virtual stop line.

FIG. 11 shows a flow diagram illustrative of embodiments of a routine 1100 implemented by the vehicle 120 to generate virtual stop line data that includes an indication of a hidden problem at the location of the virtual stop line. The elements outlined for routine 1100 may be implemented by one or more components that are associated with the data processing system 123 of the vehicle 120.

At block 1102, a vehicle stop is detected. For example, the data processing system 123 of the vehicle 120 may detect a stop based on an analysis of the vehicle 120 velocity at various time instants and/or in relation to certain road markings (e.g., stop lines, crosswalks, etc.). A process performed by the data processing system 123 to detect a vehicle stop is described in greater detail above with respect to FIG. 10.

At block 1104, a location of a vehicle at a time of the detected vehicle stop is determined. For example, the location may be determined using GPS data that identifies the location of the vehicle 120 at a time instant corresponding to the detected stop.

At block 1106, a situation of the vehicle at the determined location is determined. For example, the situation may be determined by obtaining perception data and/or map data, converting the perception data and/or map data into a grid map, and applying the grid map as an input to a trained deep neural network.

At block 1108, it is determined that a cause of the vehicle stop corresponds to a road obstacle. For example, the road obstacle may be a speed bump, a gutter that traverses a road, an informal (e.g., unmarked) crosswalk, a pothole, construction (e.g., road flares, traffic cones, detour signs, etc.), uneven surfaces, and/or the like. The determination may be made based on the determined vehicle situation and/or map data.

At block 1110, virtual stop line data is generated that includes an indication of a hidden problem at the determined location. The virtual stop line data may be generated because the determined vehicle stop cause is a reason that is of interest to the vehicle 120 and/or the server 130 in eventually generating a virtual stop line.

At block 1112, the virtual stop line data is transmitted to a server over a network. For example, the virtual stop line data can be transmitted to the vehicle data processing unit 145 of the server 130. If incorporated into the map data, the virtual stop line data may cause a vehicle 120 to alert a driver to be cautious near the geographic location corresponding to the virtual stop line and/or to enter a cautious and/or sensitive mode (e.g., automatically cause the vehicle 120, assist a driver, and/or instruct a driver to slow down more than what typically would happen at a similar type of traffic scene, to turn on headlights, fog lights, and/or blinkers, to sound a horn, to turn on traction control, etc.). After the virtual stop line data is transmitted, the routine 1100 is complete.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation. For example, in some embodiments, some or all of the operations performed by the vehicles 120 and/or the server 130 can be offloaded to a user device 102 operated by a driver, a passenger, and/or a user external to a vehicle 120.

Example Embodiments

Some example enumerated embodiments of the present invention are recited in this section in the form of methods, systems, and non-transitory computer-readable media, without limitation.

One aspect of the disclosure provides a vehicle comprising a plurality of sensors, where a first sensor in the plurality of sensors is configured to generate velocity data, and where a second sensor in the plurality of sensors is configured to generate location data. The vehicle further comprises a processor configured with computer-executable instructions, where the computer-executable instructions, when executed, cause the processor to: detect a vehicle stop at a first time instant using the generated velocity data; determine a location of the vehicle at the first time instant using the generated location data; determine, using a deep neural network stored on the vehicle, a situation of the vehicle at the determined location; determine, based on at least one of the determined situation or map data, that a cause of the detected vehicle stop is the vehicle arriving at the unmarked intersection; generate virtual stop line data in response to determining that the cause of the detected vehicle stop is the vehicle arriving at an unmarked intersection; and transmit the virtual stop line data to a server over a network via a communication array.

The vehicle of the preceding paragraph can include any sub-combination of the following features: where the location of the vehicle comprises geographical coordinates of the vehicle at the first time instant and a lane on a road in which the vehicle was positioned at the first time instant; where the computer-executable instructions, when executed, further cause the processor to: generate a grid map, apply the grid map as an input to the deep neural network, and determine the situation of the vehicle based on an output of the deep neural network; where the computer-executable instructions, when executed, further cause the processor to: obtain the map data and at least one of light detection and ranging (LiDAR) data, radar data, or camera data, and generate an image in which information derived from the map data is laid over information derived from at least one of the LiDAR data, the radar data, or the camera data to form the grid map; where the computer-executable instructions, when executed, further cause the processor to train the deep neural network using a training set of grid maps; where the computer-executable instructions, when executed, further cause the processor to: detect a second vehicle stop at a second time instant before the first time instant, and determine that a velocity of the vehicle increased by at least a velocity ripple value between the second time instant and the first time instant; where the situation of the vehicle is at least one of whether the vehicle is or is not at an intersection, whether another vehicle is or is not directly in front of the vehicle, whether an object other than the another vehicle is or is not directly in front of the vehicle, whether the vehicle is or is not adjacent to a road marking, whether the vehicle is or is not in the process of turning, whether the vehicle is or is not in the process of changing lanes, whether a bus is or is not present in front of the vehicle and at a bus stop, whether a pedestrian is or is not present behind, in front of, or to the side of the vehicle, whether a bicyclist is or is not present behind, in front of, or to the side of the vehicle, or whether a road hazard is or is not present; and where the vehicle is at least one of an autonomous vehicle, a vehicle that provides one or more driver-assist features, or a vehicle used to offer location-based services.

Another aspect of the disclosure provides a method implemented by a vehicle. The method comprises: detecting a vehicle stop at a first time instant using velocity data measured by the vehicle; determining a location of the vehicle at the first time instant; determining, based in part on execution of an artificial intelligence engine running on the vehicle, that a cause of the detected vehicle stop is the vehicle arriving at an unmarked intersection; generating virtual stop line data in response to determining that the cause of the detected vehicle stop is the vehicle arriving at the unmarked intersection; and transmitting the virtual stop line data to a server over a network.

The method of the preceding paragraph can include any sub-combination of the following features: where the location of the vehicle comprises at least one of geographical coordinates of the vehicle at the first time instant or a lane on a road in which the vehicle was positioned at the first time instant; where determining that a cause of the detected vehicle stop is the vehicle arriving at an unmarked intersection further comprises: generating a grid map, applying the grid map as an input to the artificial intelligence engine, determining a situation of the vehicle based on an output of the artificial intelligence engine, and determining the cause based on at least one of the determined situation or map data; where generating a grip map further comprises: obtaining map data and at least one of light detection and ranging (LiDAR) data, radar data, or camera data, and generating an image in which information derived from the map data is laid over information derived from at least one of the LiDAR data, the radar data, or the camera data to form the grid map; where the artificial intelligence engine is one of a deep neural network or a machine learning model; where the method further comprises training the artificial intelligence engine using a training set of grid maps; where detecting a vehicle stop further comprises: detecting a second vehicle stop at a second time instant before the first time instant, and determining that a velocity of the vehicle increased by at least a velocity ripple value between the second time instant and the first time instant; and where the vehicle is at least one of an autonomous vehicle, a vehicle that provides one or more driver-assist features, or a vehicle used to offer location-based services.

Another aspect of the disclosure provides non-transitory, computer-readable storage media comprising computer executable instructions for identifying a virtual stop line, where the computer-executable instructions, when executed by a vehicle, cause the vehicle to: detect a vehicle stop at a first time instant using velocity data measured by the vehicle; determine a location of the vehicle at the first time instant; determine, based in part on execution of an artificial intelligence engine running on the vehicle, that a cause of the detected vehicle stop is the vehicle arriving at an unmarked intersection; generate virtual stop line data in response to determining that the cause of the detected vehicle stop is the vehicle arriving at the unmarked intersection; and transmit the virtual stop line data external to the vehicle.

The non-transitory, computer-readable storage media of the preceding paragraph can include any sub-combination of the following features: where the location of the vehicle comprises at least one of geographical coordinates of the vehicle at the first time instant or a lane on a road in which the vehicle was positioned at the first time instant; where the computer-executable instructions, when executed, further cause the vehicle to: generate a grid map, apply the grid map as an input to the artificial intelligence engine, determine a situation of the vehicle based on an output of the artificial intelligence engine, and determine the cause based on at least one of the determined situation or map data; and where the artificial intelligence engine is one of a deep neural network or a machine learning model.

Another aspect of the disclosure provides a system comprising a plurality of vehicles. The system further comprises a computing device in communication with the plurality of vehicles over a network, the computing device comprising a processor configured with computer-executable instructions that, when executed, cause the computing device to: obtain first virtual line data from a first vehicle in the plurality of vehicles; obtain second virtual line data from a second vehicle in the plurality of vehicles; aggregate the first virtual line data and the second virtual line data using a statistical analysis; and determine a representative virtual line based on the aggregation of the first virtual line data and the second virtual line data, where the representative virtual line, when incorporated into map data, causes at least some of the vehicles in the plurality of vehicles to operate in accordance with the representative virtual line.

The system of the preceding paragraph can include any sub-combination of the following features: where the first virtual line data is one of first virtual stop line data or first virtual yield line data; where the representative virtual line is one of a representative virtual stop line or a representative virtual yield line; where the computer-executable instructions, when executed, further cause the computing device to select one of a first virtual line corresponding to the first virtual line data or a second virtual line corresponding to the second virtual line data as the representative virtual line; where the representative virtual line corresponds to at least one of a geographic location, a range of geographic locations, or a lane in a road derived from the aggregation of the first virtual line data and the second virtual line data; where the first virtual line data corresponds to a first intersection, and the second virtual line data corresponds to the first intersection; where the first virtual line data corresponds to a first location in the first intersection, and where the second virtual line data corresponds to a second location different than the first location in the first intersection; where the computer-executable instructions, when executed, further cause the computing device to: obtain third virtual line data from the first vehicle, where the first virtual line data and the third virtual line data correspond to a first intersection, and where the first virtual line data and the third virtual line data correspond to different time instants, and aggregate the first virtual line data, the second virtual line data, and the third virtual line data using the statistical analysis; where the first virtual line data corresponds to a first location in the first intersection, and where the third virtual line data corresponds to a second location different than the first location in the first intersection; and where each of the plurality of vehicles is at least one of an autonomous vehicle, a vehicle that provides one or more driver-assist features, or a vehicle used to offer location-based services.

Another aspect of the disclosure provides computer-implemented method comprising: as implemented by one or more computing devices in communication with a first vehicle over a network, obtaining first virtual line data from the first vehicle, where the first virtual line data corresponds to a first time instant and a first intersection; obtaining second virtual line data from the first vehicle, where the second virtual line data corresponds to a second time instant after the first time instant and the first intersection; clustering the first virtual line data and the second virtual line data; and determining a representative virtual line based on the clustering of the first virtual line data and the second virtual line data, where the representative virtual line, when accessed, causes at least one of the first vehicle or another vehicle to operate in accordance with the representative virtual line.

The computer-implemented method of the preceding paragraph can include any sub-combination of the following features: where the first virtual line data is one of first virtual stop line data or first virtual yield line data; where the representative virtual line is one of a representative virtual stop line or a representative virtual yield line; where determining a representative virtual line further comprises selecting one of a first virtual line corresponding to the first virtual line data or a second virtual line corresponding to the second virtual line data to be the representative virtual line; where the representative virtual line, when accessed, causes at least one of the first vehicle or another vehicle to stop at a location corresponding to the representative virtual line; where the first virtual line data corresponds to a first location in the first intersection, and where the second virtual line data corresponds to a second location different than the first location in the first intersection; and where the first vehicle is at least one of an autonomous vehicle, a vehicle that provides one or more driver-assist features, or a vehicle used to offer location-based services.

Another aspect of the disclosure provides non-transitory, computer-readable storage media comprising computer executable instructions for identifying a representative virtual line, where the computer-executable instructions, when executed by a computing system, cause the computing system to: obtain first virtual line data from a first vehicle, where the first virtual line data corresponds to a first time instant; obtain second virtual line data from the first vehicle, where the second virtual line data corresponds to a second time instant after the first time instant; cluster the first virtual line data and the second virtual line data; and determine a representative virtual line based on the clustering of the first virtual line data and the second virtual line data, where the representative virtual line, when accessed, causes at least one of a driver alert to be generated or vehicle operation to commence in accordance with the representative virtual line.

The non-transitory, computer-readable storage media of the preceding paragraph can include any sub-combination of the following features: where the representative virtual line is one of a representative virtual stop line or a representative virtual yield line; and where the driver alert comprises an indication that the first vehicle should stop at a location corresponding to the representative virtual line.

Another aspect of the disclosure provides a system comprising a plurality of vehicles. The system further comprises a computing device in communication with the plurality of vehicles over a network, the computing device comprising a processor configured with computer-executable instructions that, when executed, cause the computing device to: obtain first virtual line data from a first vehicle in the plurality of vehicles; obtain second virtual line data from a second vehicle in the plurality of vehicles; determine a representative virtual line based on the first virtual line data and the second virtual line data; validate the representative virtual line; update map data to incorporate the representative virtual line; and transmit the updated map data to the plurality of vehicles, where the updated map data, when accessed, causes at least some of the vehicles in the plurality of vehicles to operate in accordance with the representative virtual line.

The system of the preceding paragraph can include any sub-combination of the following features: where the first virtual line data is one of first virtual stop line data or first virtual yield line data; where the representative virtual line is one of a representative virtual stop line or a representative virtual yield line; where the computer-executable instructions, when executed, further cause the computing device to: compare the representative virtual line with a marked line present in the map data, determine that the representative virtual line is at least a threshold distance away from the marked line based on the comparison, and validate the representative virtual line based on the determination that the representative virtual line is at least the threshold distance away from the marked line; where the representative virtual line corresponds to at least one of a geographic location, a range of geographic locations, or a lane in a road derived from at least one of the first virtual line data and the second virtual line data; where the first virtual line data corresponds to a first intersection, and the second virtual line data corresponds to the first intersection; where the first virtual line data corresponds to a first location in the first intersection, and where the second virtual line data corresponds to a second location different than the first location in the first intersection; where the computer-executable instructions, when executed, further cause the computing device to: obtain third virtual line data from the first vehicle, where the first virtual line data and the third virtual line data correspond to a first intersection, and where the first virtual line data and the third virtual line data correspond to different time instants, and determine the representative virtual line based on the first virtual line data, the second virtual line data, and the third virtual line data; where the first virtual line data corresponds to a first location in the first intersection, and where the third virtual line data corresponds to a second location different than the first location in the first intersection; and where each of the plurality of vehicles is at least one of an autonomous vehicle, a vehicle that provides one or more driver-assist features, or a vehicle used to offer location-based services.

Another aspect of the disclosure provides a computer-implemented method comprising: as implemented by one or more computing devices in communication with a first vehicle over a network, obtaining first virtual line data from the first vehicle, where the first virtual line data corresponds to a first time instant and a first intersection; obtaining second virtual line data from the first vehicle, where the second virtual line data corresponds to a second time instant after the first time instant and the first intersection; determining a representative virtual line based on the first virtual line data and the second virtual line data; updating map data to incorporate the representative virtual line; and transmitting the updated map data to the first vehicle, where the updated map data, when accessed, causes at least one of the first vehicle or another vehicle to operate in accordance with the representative virtual line.

The computer-implemented method of the preceding paragraph can include any sub-combination of the following features: where the first virtual line data is one of first virtual stop line data or first virtual yield line data; where the representative virtual line is one of a representative virtual stop line or a representative virtual yield line; where the computer-implemented method further comprises determining that a validation of the representative virtual line succeeded; where determining that a validation of the representative virtual line succeeded further comprises: comparing the representative virtual line with a marked line present in the map data, determining that the representative virtual line is at least a threshold distance away from the marked line based on the comparison, and validating the representative virtual line based on the determination that the representative virtual line is at least the threshold distance away from the marked line; where the updated map data, when accessed, causes at least one of the first vehicle or another vehicle to stop at a location corresponding to the representative virtual line; and where the first vehicle is at least one of an autonomous vehicle, a vehicle that provides one or more driver-assist features, or a vehicle used to offer location-based services.

Another aspect of the disclosure provides non-transitory, computer-readable storage media comprising computer executable instructions for editing a map, where the computer-executable instructions, when executed by a computing system, cause the computing system to: obtain first virtual line data from the first vehicle, where the first virtual line data corresponds to a first time instant; obtain second virtual line data from the first vehicle, where the second virtual line data corresponds to a second time instant after the first time instant; determine a representative virtual line based on the first virtual line data and the second virtual line data; update map data to incorporate the representative virtual line; and transmit the updated map data to the first vehicle, where the updated map data, when accessed, causes at least one of an alert to be generated for display in the first vehicle or operation of the first vehicle to commence in accordance with the representative virtual line.

The non-transitory, computer-readable storage media of the preceding paragraph can include any sub-combination of the following features: where the representative virtual line is one of a representative virtual stop line or a representative virtual yield line; and where the alert comprises an indication that the first vehicle should stop at a location corresponding to the representative virtual line.

Another aspect of the disclosure provides a vehicle comprising a first sensor configured to generate velocity data. The vehicle further comprises: a processor configured with computer-executable instructions, where the computer-executable instructions, when executed, cause the processor to: identify, based on the velocity data, a trough in a plurality of velocity values, where the trough occurs at a first time instant; determine that a first velocity value in the plurality of velocity values that corresponds to the first time instant is below a velocity threshold value; determine that a prior vehicle stop occurred at a second time instant that is less than a threshold time before the first time instant; determine that a velocity of the vehicle increased by at least a velocity ripple value between the second time instant and the first time instant; and detect a second vehicle stop at the first time instant in response to the determination that the velocity of the vehicle increased by at least the velocity ripple value between the second time instant and the first time instant.

The vehicle of the preceding paragraph can include any sub-combination of the following features: where the prior vehicle stop corresponds to a second trough in the plurality of velocity values, where the second trough corresponds to the second time instant; the second trough corresponds to a second velocity value in the plurality of velocity values, and where a difference between a third velocity value in the plurality of velocity values corresponding to a third time instant between the first and second time instants and the second velocity value is greater than the velocity ripple value; where the computer-executable instructions, when executed, further cause the processor to: identify, based on the velocity data, a second trough in the plurality of velocity values, where the second trough occurs at a third time instant after the first time instant, determine that a second velocity value in the plurality of velocity values that corresponds to the third time instant is above the velocity threshold value, and determine that a third vehicle stop did not occur at the third time instant; where the computer-executable instructions, when executed, further cause the processor to: identify, based on the velocity data, a second trough in the plurality of velocity values, where the second trough occurs at a third time instant after the first time instant, determine that a second velocity value in the plurality of velocity values that corresponds to the third time instant is below the velocity threshold value, determine that the second vehicle stop occurred more than the threshold time before the third time instant, and detect a third vehicle stop at the third time instant; where the computer-executable instructions, when executed, further cause the processor to: identify, based on the velocity data, a second trough in the plurality of velocity values, where the second trough occurs at a third time instant after the first time instant, determine that a second velocity value in the plurality of velocity values that corresponds to the third time instant is below the velocity threshold value, determine that the second vehicle stop occurred within the threshold time of the third time instant, determine that a velocity of the vehicle did not increase by at least the velocity ripple value between the first time instant and the third time instant, and determine that a third vehicle stop did not occur at the third time instant; where the first sensor is one of a radar sensor, a speedometer, an accelerometer, a camera, a light detection and ranging (LiDAR) sensor, or a global positioning system (GPS); and where the vehicle is at least one of an autonomous vehicle, a vehicle that provides one or more driver-assist features, or a vehicle used to offer location-based services.

Another aspect of the disclosure provides a method implemented by a vehicle. The method comprises: obtaining velocity data from a first sensor coupled to or embedded within the vehicle; determining, based on the velocity data, that a first velocity value corresponding to a first time instant is below a velocity threshold value; determining that a prior vehicle stop occurred at a second time instant that is less than a threshold time before the first time instant; determining that a velocity of the vehicle increased by at least a velocity ripple value between the second time instant and the first time instant; and detecting a second vehicle stop at the first time instant in response to the determination that the velocity of the vehicle increased by at least the velocity ripple value between the second time instant and the first time instant.

The method of the preceding paragraph can include any sub-combination of the following features: where the prior vehicle stop corresponds to a second velocity value, where the second velocity value is at a trough of velocity values; where a difference between a third velocity value corresponding to a third time instant between the first and second time instants and the second velocity value is greater than the velocity ripple value; where the method further comprises: identifying, based on the velocity data, a second velocity value corresponding to a third time instant after the first time instant, determining that the second velocity value is above the velocity threshold value, and determining that a third vehicle stop did not occur at the third time instant; where the method further comprises: identifying, based on the velocity data, a second velocity value corresponding to a third time instant after the first time instant, determining that the second velocity value is below the velocity threshold value, determining that the second vehicle stop occurred more than the threshold time before the third time instant, and detecting a third vehicle stop at the third time instant; where the method further comprises: identifying, based on the velocity data, a second velocity value corresponding to a third time instant after the first time instant, determining that the second velocity value is below the velocity threshold value, determining that the second vehicle stop occurred within the threshold time of the third time instant, determining that a velocity of the vehicle did not increase by at least the velocity ripple value between the first time instant and the third time instant, and determining that a third vehicle stop did not occur at the third time instant; where the first sensor is one of a radar sensor, a speedometer, an accelerometer, a camera, a light detection and ranging (LiDAR) sensor, or a global positioning system (GPS); and where the vehicle is at least one of an autonomous vehicle, a vehicle that provides one or more driver-assist features, or a vehicle used to offer location-based services.

Another aspect of the disclosure provides non-transitory, computer-readable storage media comprising computer executable instructions for detecting a stop, where the computer-executable instructions, when executed by a vehicle, cause the vehicle to: determine, based on velocity data obtained from a first sensor of the vehicle, that a first velocity value corresponding to a first time instant is below a velocity threshold value; determine that a prior vehicle stop occurred at a second time instant that is less than a threshold time before the first time instant; determine that a velocity of the vehicle increased by at least a velocity ripple value between the second time instant and the first time instant; and detect a second vehicle stop at the first time instant in response to the determination that the velocity of the vehicle increased by at least the velocity ripple value between the second time instant and the first time instant.

The non-transitory, computer-readable storage media of the preceding paragraph can include any sub-combination of the following features: where the computer-executable instructions, when executed, further cause the vehicle to: identify, based on the velocity data, a second velocity value corresponding to a third time instant after the first time instant, determine that the second velocity value is above the velocity threshold value, and determine that a third vehicle stop did not occur at the third time instant; where the computer-executable instructions, when executed, further cause the vehicle to: identify, based on the velocity data, a second velocity value corresponding to a third time instant after the first time instant, determine that the second velocity value is below the velocity threshold value, determine that the second vehicle stop occurred more than the threshold time before the third time instant, and detect a third vehicle stop at the third time instant; and where the computer-executable instructions, when executed, further cause the vehicle to: identify, based on the velocity data, a second velocity value corresponding to a third time instant after the first time instant, determine that the second velocity value is below the velocity threshold value, determine that the second vehicle stop occurred within the threshold time of the third time instant, determine that a velocity of the vehicle did not increase by at least the velocity ripple value between the first time instant and the third time instant, and determine that a third vehicle stop did not occur at the third time instant.

Another aspect of the disclosure provides a vehicle comprising a plurality of sensors, where a first sensor in the plurality of sensors is configured to generate velocity data, and where a second sensor in the plurality of sensors is configured to generate location data. The vehicle further comprises a processor configured with computer-executable instructions, where the computer-executable instructions, when executed, cause the processor to: detect a vehicle stop at a first time instant using the generated velocity data; determine a location of the vehicle at the first time instant using the generated location data; determine, using a deep neural network stored on the vehicle, a situation of the vehicle at the determined location; determine, based on at least one of the determined situation or map data, that a cause of the detected vehicle stop is a road obstacle; generate virtual stop line data in response to determining that the cause of the detected vehicle stop is the road obstacle, where the virtual stop line data comprises an indication of a hidden problem at the determined location; and transmit the virtual stop line data to a server over a network via a communication array.

The vehicle of the preceding paragraph can include any sub-combination of the following features: where the location of the vehicle comprises geographical coordinates of the vehicle at the first time instant and a lane on a road in which the vehicle was positioned at the first time instant; where the computer-executable instructions, when executed, further cause the processor to: generate a grid map, apply the grid map as an input to the deep neural network, and determine the situation of the vehicle based on an output of the deep neural network; where the computer-executable instructions, when executed, further cause the processor to: obtain the map data and at least one of light detection and ranging (LiDAR) data, radar data, or camera data, and generate an image in which information derived from the map data is laid over information derived from at least one of the LiDAR data, the radar data, or the camera data to form the grid map; where the computer-executable instructions, when executed, further cause the processor to train the deep neural network using a training set of grid maps; where the computer-executable instructions, when executed, further cause the processor to: detect a second vehicle stop at a second time instant before the first time instant, and determine that a velocity of the vehicle increased by at least a velocity ripple value between the second time instant and the first time instant; where the road obstacle comprises at least one of a speed bump, a gutter, an unmarked crosswalk, a pothole, a road flare, a traffic cone, a detour sign, or an uneven surface; and where the vehicle is at least one of an autonomous vehicle, a vehicle that provides one or more driver-assist features, or a vehicle used to offer location-based services.

Another aspect of the disclosure provides a method implemented by a vehicle. The method comprises: detecting a vehicle stop at a first time instant using velocity data measured by the vehicle; determining a location of the vehicle at the first time instant; determining, based in part on execution of an artificial intelligence engine running on the vehicle, that a cause of the detected vehicle stop is a road obstacle; generating virtual stop line data in response to determining that the cause of the detected vehicle stop is the road obstacle, where the virtual stop line data comprises an indication of a hidden danger at the determined location; and transmitting the virtual stop line data to a server over a network.

The method of the preceding paragraph can include any sub-combination of the following features: where the method further comprises operating in a sensitive mode at the determined location in response to accessing map data incorporating information derived from the virtual stop line data; where determining that a cause of the detected vehicle stop is road obstacle further comprises: generating a grid map, applying the grid map as an input to the artificial intelligence engine, determining a situation of the vehicle based on an output of the artificial intelligence engine, and determining the cause based on at least one of the determined situation or map data; where generating a grip map further comprises: obtaining map data and at least one of light detection and ranging (LiDAR) data, radar data, or camera data, and generating an image in which information derived from the map data is laid over information derived from at least one of the LiDAR data, the radar data, or the camera data to form the grid map; where the artificial intelligence engine is one of a deep neural network or a machine learning model; where the road obstacle comprises at least one of a speed bump, a gutter, an unmarked crosswalk, a pothole, a road flare, a traffic cone, a detour sign, or an uneven surface; where detecting a vehicle stop further comprises: detecting a second vehicle stop at a second time instant before the first time instant, and determining that a velocity of the vehicle increased by at least a velocity ripple value between the second time instant and the first time instant; and where the vehicle is at least one of an autonomous vehicle, a vehicle that provides one or more driver-assist features, or a vehicle used to offer location-based services.

Another aspect of the disclosure provides non-transitory, computer-readable storage media comprising computer executable instructions for identifying a virtual stop line, where the computer-executable instructions, when executed by a vehicle, cause the vehicle to: detect a vehicle stop at a first time instant using velocity data measured by the vehicle; determine a location of the vehicle at the first time instant; determine, based in part on execution of an artificial intelligence engine running on the vehicle, that a cause of the detected vehicle stop is a road obstacle; generate virtual stop line data in response to determining that the cause of the detected vehicle stop is the road obstacle, where the virtual stop line data comprises an indication of a hidden danger at the determined location; and transmit the virtual stop line data external to the vehicle.

The non-transitory, computer-readable storage media of the preceding paragraph can include any sub-combination of the following features: where the computer-executable instructions, when executed, further cause the vehicle to operate in a sensitive mode at the determined location in response to accessing map data incorporating information derived from the virtual stop line data; where the computer-executable instructions, when executed, further cause the vehicle to: generate a grid map, apply the grid map as an input to the artificial intelligence engine, determine a situation of the vehicle based on an output of the artificial intelligence engine, and determine the cause based on at least one of the determined situation or map data; and where the artificial intelligence engine is one of a deep neural network or a machine learning model.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A vehicle comprising:
   a plurality of sensors, wherein a first sensor in the plurality of sensors is configured to generate velocity data, and wherein a second sensor in the plurality of sensors is configured to generate location data; and
   a processor configured with computer-executable instructions, wherein the computer-executable instructions, when executed, cause the processor to:
      detect, at a first time instant, a partial vehicle stop at which the vehicle slows by at least a threshold velocity using the generated velocity data;
      determine a location of the vehicle at the first time instant using the generated location data;
      generate a grid map in which information derived from map data and having a first color is laid over information derived from captured sensor data and having a second color;
      determine, by application of the grid map as an input to an artificial intelligence model stored on the vehicle, a scene surrounding the vehicle at the determined location;
      determine, based on at least one of the determined scene or the map data, that a cause of the detected partial vehicle stop is the vehicle arriving at a road feature that vehicles pass without coming to a complete stop; and
      cause the map data to be updated to include a virtual partial stop line at the location.

2. The vehicle of claim 1, wherein the location of the vehicle comprises geographical coordinates of the vehicle at the first time instant and a lane on a road in which the vehicle was positioned at the first time instant.

3. The vehicle of claim 1, wherein the computer-executable instructions, when executed, further cause the processor to determine the scene surrounding the vehicle based on an output of the artificial intelligence model.

4. The vehicle of claim 3, wherein the computer-executable instructions, when executed, further cause the processor to:
   obtain the map data and at least one of light detection and ranging (LiDAR) data, radar data, or camera data; and
   generate an image in which information derived from the map data is laid over information derived from at least one of the LiDAR data, the radar data, or the camera data to form the grid map.

5. The vehicle of claim 1, wherein the computer-executable instructions, when executed, further cause the processor to train the artificial intelligence model using a training set of grid maps.

6. The vehicle of claim 1, wherein the scene surrounding the vehicle is at least one of whether the vehicle is or is not at an intersection, whether another vehicle is or is not directly in front of the vehicle, whether an object other than the another vehicle is or is not directly in front of the vehicle, whether the vehicle is or is not adjacent to a road marking, whether the vehicle is or is not in a process of turning, whether the vehicle is or is not in the process of changing lanes, whether a bus is or is not present in front of the vehicle and at a bus stop, whether a pedestrian is or is not present behind, in front of, or to a side of the vehicle, whether a bicyclist is or is not present behind, in front of, or to the side of the vehicle, or whether a road hazard is or is not present.

7. The vehicle of claim 1, wherein the vehicle is at least one of an autonomous vehicle, a vehicle that provides one or more driver-assist features, or a vehicle used to offer location-based services.

8. The vehicle of claim 1, wherein the road feature comprises one of a speed bump, a gutter, an unmarked crosswalk, or a railroad crossing.

9. A method implemented by a vehicle, the method comprising:
  detecting, at a first time instant, a partial vehicle stop at which the vehicle slows by at least a threshold velocity using velocity data measured by the vehicle;
  determining a location of the vehicle at the first time instant;
  generating a grid map in which information derived from map data and having a first color is laid over information derived from captured sensor data and having a second color;
  determining, based in part on application of the grid map as an input to an artificial intelligence model running on the vehicle that outputs a scene surrounding the vehicle, that a cause of the detected partial vehicle stop is the vehicle arriving at a road feature that vehicles pass without coming to a complete stop; and
  causing the map data to be updated to include a virtual partial stop line at the location.

10. The method of claim 9, wherein the location of the vehicle comprises at least one of geographical coordinates of the vehicle at the first time instant or a lane on a road in which the vehicle was positioned at the first time instant.

11. The method of claim 9, wherein determining that a cause of the detected vehicle stop is the vehicle arriving at an unmarked intersection further comprises:
  determining the scene surrounding the vehicle based on an output of the artificial intelligence model; and
  determining the cause based on at least one of the determined scene or the map data.

12. The method of claim 11, wherein generating a grid map further comprises:
  obtaining the map data and at least one of light detection and ranging (LiDAR) data, radar data, or camera data; and
  generating an image in which information derived from the map data is laid over information derived from at least one of the LiDAR data, the radar data, or the camera data to form the grid map.

13. The method of claim 9, wherein the artificial intelligence model is one of a deep neural network or a machine learning model.

14. The method of claim 9, further comprising training the artificial intelligence model using a training set of grid maps.

15. The method of claim 9, wherein the vehicle is at least one of an autonomous vehicle, a vehicle that provides one or more driver-assist features, or a vehicle used to offer location-based services.

16. The method of claim 9, wherein the road feature comprises one of a speed bump, a gutter, an unmarked crosswalk, or a railroad crossing.

17. Non-transitory, computer-readable storage media comprising computer executable instructions for identifying a virtual partial stop line, wherein the computer-executable instructions, when executed by a vehicle, cause the vehicle to:
  detect, at a first time instant, a partial vehicle stop at which the vehicle slows by at least a threshold velocity using velocity data measured by the vehicle;
  determine a location of the vehicle at the first time instant;
  generate a grid map in which information derived from map data and having a first color is laid over information derived from captured sensor data and having a second color;
  determine, based in part on application of the grid map as an input to an artificial intelligence model running on the vehicle that outputs a scene surrounding the vehicle, that a cause of the detected partial vehicle stop is the vehicle arriving at a road feature that vehicles pass without coming to a complete stop; and
  cause the map data to be updated to include the virtual partial stop line at the location.

18. The non-transitory, computer-readable storage media of claim 17, wherein the location of the vehicle comprises at least one of geographical coordinates of the vehicle at the first time instant or a lane on a road in which the vehicle was positioned at the first time instant.

19. The non-transitory, computer-readable storage media of claim 17, wherein the computer-executable instructions, when executed, further cause the vehicle to:
  determine the scene surrounding the vehicle based on an output of the artificial intelligence model; and
  determine the cause based on at least one of the determined scene or the map data.

20. The non-transitory, computer-readable storage media of claim 17, wherein the road feature comprises one of a speed bump, a gutter, an unmarked crosswalk, or a railroad crossing.

* * * * *